US008300062B2

(12) United States Patent
Tsang et al.

(10) Patent No.: US 8,300,062 B2
(45) Date of Patent: Oct. 30, 2012

(54) METHOD, SYSTEM AND COMPUTER PROGRAM FOR USING A SUGGESTIVE MODELING INTERFACE

(76) Inventors: Steve Tsang, Toronto (CA); Karan Singh, Toronto (CA); Abhishek Ranjan, Toronto (CA); Ravin Balakrishnan, Toronto (CA)

( * ) Notice: Subject to any disclaimer, the term of this patent is extended or adjusted under 35 U.S.C. 154(b) by 87 days.

(21) Appl. No.: 11/405,469

(22) Filed: Apr. 18, 2006

(65) Prior Publication Data
US 2006/0250393 A1    Nov. 9, 2006

(51) Int. Cl.
*G09G 5/00* (2006.01)
(52) U.S. Cl. ........................................ 345/619; 345/420
(58) Field of Classification Search .................. 345/619, 345/621, 420
See application file for complete search history.

(56) References Cited

U.S. PATENT DOCUMENTS

| | | | | |
|---|---|---|---|---|
| 5,452,238 | A * | 9/1995 | Kramer et al. ..................... | 703/1 |
| 5,649,080 | A * | 7/1997 | Minakata ...................... | 345/427 |
| 5,680,523 | A * | 10/1997 | Watkins et al. ................ | 345/419 |
| 5,764,936 | A * | 6/1998 | Evans et al. .................... | 715/861 |
| 5,861,874 | A * | 1/1999 | Joto .............................. | 345/173 |
| 5,984,511 | A * | 11/1999 | Vasey-Glandon et al. ......... | 703/6 |
| 6,628,279 | B1 * | 9/2003 | Schell et al. .................. | 345/420 |
| 6,718,075 | B1 * | 4/2004 | Yamamoto .................... | 382/305 |
| 6,906,713 | B2 * | 6/2005 | Koshiro et al. ............... | 345/420 |
| 7,337,093 | B2 * | 2/2008 | Ramani et al. .................... | 703/1 |
| 2001/0052883 | A1 * | 12/2001 | Iwagaki et al. ................ | 345/2.1 |
| 2003/0222868 | A1 * | 12/2003 | Raskar et al. ................. | 345/419 |
| 2004/0060037 | A1 * | 3/2004 | Damm et al. .................. | 717/104 |
| 2004/0243599 | A1 * | 12/2004 | Arnstein et al. .............. | 707/100 |
| 2004/0249809 | A1 * | 12/2004 | Ramani et al. .................... | 707/4 |
| 2005/0046624 | A1 * | 3/2005 | Jayaram et al. ................ | 345/419 |
| 2005/0062740 | A1 * | 3/2005 | Tobita et al. .................. | 345/427 |
| 2005/0168460 | A1 * | 8/2005 | Razdan et al. ................. | 345/419 |
| 2006/0023923 | A1 * | 2/2006 | Geng et al. ..................... | 382/116 |
| 2006/0082571 | A1 * | 4/2006 | McDaniel ...................... | 345/419 |

OTHER PUBLICATIONS http://web.archive.org/web/20041229131755/www.clipart.com/en/index.*
Herndon et al., "SKETCH: an interface for sketching 3D scenes", Proceedings of SIGGRAPH-96, 1996.*
Bimber et al., "A multi-layered architecture for sketch-based interation within virtual environments", Computers & Graphics vol. 24, Issue 6, Dec. 2000, pp. 851-867.*
Teddy: A Sketching Interface for 3D Freeform Design, Takeo Igarashi et al., 1999, ACM SIGGRAPH, p. 409-416 ("TEDDY").
"SKETCH: An interface for sketching 3D scenes", R.C. Zeleznik et al., 1996, ACM SIGGRAPH 1996 Conference on Computer Graphics and Interactive Techniques, p. 163-170 ("SKETCH").
Interactive beautification: a technique for rapid geometric design, T. Igarashi et al., 1997, ACM UIST Symposium on User interface Software and Technology, p. 105-114.

(Continued)

*Primary Examiner* — Michelle L Sams

(57) ABSTRACT

A method, computer system and computer program is provided for using a suggestive modeling interface. The method consists of a method of a computer-implemented rendering of sketches, the method comprising the steps of: (1) a user activating a sketching application; (2) in response, the sketching application displaying on a screen a suggestive modeling interface; (3) the sketching application importing a sketch to the suggestive modeling interface; and (4) the sketching application retrieving from a database one or more suggestions based on the sketch. The method is operable to allow a user interactively using the sketching application to create a drawing that is guided by the imported sketch by selectively using one or more image guided drawing tools provided by the sketching application. The present invention is well-suited for three-dimensional modeling applications.

23 Claims, 18 Drawing Sheets

OTHER PUBLICATIONS

Pegasus: A drawing system for rapid geometric design, T. Igarashi et al., 1998, Extended Abstracts of ACM CHI Conference no Human Factors in Computing Systems, p. 24-25.

Design galleries: A general approach to setting parameters for computer graphics and animation, Marks. J. et al., 1997, ACM SIGGRAPH Conference on Computer . . . p. 389-400.

Interaction techniques for 3D modeling on large displays, Grossman, T. et al., 2001, ACM 13DG 1999 Symposium on Interactive 3D Graphics, p. 17-23.

Creating principal 3D curves with digital tape drawing, Grossman, T. et al., 2002, ACM CHI 2002 Conference on Human Factors in Computing Systems, p. 121-128.

* cited by examiner

METHOD, SYSTEM AND COMPUTER PROGRAM FOR USING A SUGGESTIVE MODELING INTERFACE

FIELD OF THE INVENTION

This invention relates generally to methods, computer programs, and systems for computer modeling. This invention relates more particularly to an image guided pen-based method, system, computer program, and a related interface, for the creation of computer-implemented renderings of sketches. This invention further relates to a method of promoting goods or services by associating the vendors of goods or services with the computer program of the present invention.

BACKGROUND OF THE INVENTION

Current digital three-dimensional modeling software, including gesture based interfaces, predictive and suggestive interfaces, recognition systems, image understanding, constraint based systems, and curve creation techniques, enable the creation and manipulation of extremely sophisticated geometric objects, and has been widely adopted by practitioners in industry. Such software programs include: Pro/ENGINEER™, SolidWorks™, and AutoCAD™. However, as illustrated below, there are disadvantages in using such prior art technologies for the purpose of three-dimensional sketching for effective and easy integration into paper/pencil based sketching processes involved in many creative processes.

The user interfaces for these three-dimensional modelers, however, are typically quite complex, relying on the standard WIMP (Windows, Icons, Menus and Pointing devices) interaction metaphor to perform all tasks, typically using a mouse and keyboard as the primary input devices.

The principal disadvantage in using the current digital three-dimensional modeling software is that the ability of individuals involved in creative processes such as designers (in many different fields of endeavour), artists, and architects (collectively referred to in this disclosure as "designers") to work in rich physical media is generally not fully leveraged in current WIMP based solutions, as particularized below.

Given that the fidelity of current digital tools often does not approach that of physical tools, many traditional methods continue to be used in the industry. In particular, in the early stages of designing a three-dimensional model, paper and pencil is typically used to quickly create and iterate on concept sketches. However, there is currently no mechanism for easily integrating the concept sketches into the three-dimensional modeling pipeline and related digital processes. The disadvantage is that at present, pencil and paper sketches are generally not used for anything more than an external visual reference when designs are created by or for designers using digital creative tools. For example, in the case of architects, their pencil and paper sketches are often used by support staff to create three-dimensional models built painstakingly from low level graphical primitives. This not only represents additional work, but can result in the loss of certain layers of or richness of data.

An improved sketching interface is discussed in "Teddy: A Sketching Interface for 3D Freeform Design", Takeo Igarashi et al., 1999, ACM SIGGRAPH, p. 409-416 ("TEDDY"). Systems like TEDDY enable the creation of three-dimensional models using a gesture and sketching interface that allow users to quickly and directly sketch their models and offer useful suggestions for subsequent actions based on the current context. However, even such interfaces do not adequately leverage the invaluable pencil and paper sketches.

Gestural interfaces depart from the WIMP metaphor by inferring actions from user input strokes, rather than relying on explicit manipulation of onscreen widgets. Generally, gesture-based interfaces, used in two-dimensional pen-based applications recognize specific stroke shapes as gestures and replace them with predefined primitives or invoke editing operations such as undo. For example, the system described in "SKETCH: An interface for sketching 3D scenes", R. C. Zeleznik et al., 1996, ACM SIGGRAPH 1996 Conference on Computer Graphics and Interactive Techniques, p. 163-170 ("SKETCH") provides a gesture based interface for creating three dimensional scenes consisting of stacked geometric primitives.

The TEDDY system for sketching freeform three-dimensional models improves upon the usability of SKETCH by using a smaller but more easily understood gesture set, at the expense of being able to create relatively simple objects. The essential idea in TEDDY is to use the freeform strokes as an expressive design tool. The user draws two-dimensional freeform strokes interactively on a blank canvas specifying the silhouette of an object and the system automatically constructs a three-dimensional polygonal surface model based on the strokes. TEDDY also allows suggestions to be inferred based on hints provided by the user at the immediate past timestep.

SKETCH and TEDDY are similar in that users start from a blank canvas and explicitly create every single piece of geometry. However, in TEDDY, ideas were extended from the predictive interfaces of the SKETCH system by providing suggestions of geometry that could be used next. Both TEDDY and SKETCH systems operate on the principle that the suggestions can be inferred, provided that the user's hints correspond to a matching algorithm.

The main disadvantage inherent in the TEDDY and SKETCH systems is that they tend to reproduce the feature curves of the input image on a blank canvas with the designers drawing all parts of the new model. A further disadvantage of blank canvas and matching algorithm based solutions is that the algorithms in these systems are not robust enough to recognize the hints from human-drawn sketches so as to infer suggestions from the user's hints.

Another prior art system is generally known as "Pegasus" and is described in "Interactive beautification: a technique for rapid geometric design", T. Igarashi et al., 1997, ACM UIST Symposium on User Interface Software and Technology, p. 105-114, and "Pegasus: A drawing system for rapid geometric design", T. Igarashi et al., 1998, Extended Abstracts of ACM CHI Conference on Human Factors in Computing Systems, p. 24-25 (collectively "PEGASUS"). Three-dimensional computer renderings of sketches using the PEGASUS system generally improve on the hand-drawn strokes by interactively extending the notion of beautification and prediction. PEGASUS beautifies hand-drawn strokes by inferring desirable geometric properties and predicts the next operation based on the surrounding context. It also generates multiple candidates to facilitate these processes. However, the disadvantage of generating too many potential candidates on the scene is that it clutters the scene and presents problems for the average user.

There are also recognition-based systems for handwriting, speech, and text input techniques that also face the problem of resolving ambiguity of among multiple candidates. Multiple candidates are also generated when searching for good possibilities within large parameter spaces in other graphic applications.

Another disadvantage of the prior art inventions is that even if they are able to generate multiple candidate suggestions, the user interface is not conducive to integration of such multiple candidate suggestions into the creative process of designers. For example, in each of the TEDDY and PEGASUS prior art systems, the multiple candidate suggestions are produced in a separate location on the screen thus forcing the user to context switch between locales; or the multiple candidate suggestions are presented as representative examples of a large continuous space as in the recognition-based systems described in "Design galleries: A general approach to setting parameters for computer graphics and animation", Marks, J. et al., 1997, ACM SIGGRAPH Conference on Computer Graphics and Interactive Techniques, p. 389-400.

Also, the current digital tools generally require that users learn a new skill set, which constitutes a relatively significant barrier to adoption and use.

There is therefore a need for method, system and computer program that permits designers to use their pen on paper concept sketches meaningfully in the construction of computer implemented models, both two- and three-dimensional. There is a need for such a method, system and computer program that dynamically provides intuitive suggestions based on inference of subsequent geometric possibilities. There is also a need for an interface that enables dynamic interaction with paper and pencil sketches in a modeling pipeline. There is a further need for a method, system and computer program as stated before, that includes a graphic user interface that is easy to use.

SUMMARY OF THE INVENTION

A method, computer system and computer program is provided for using a suggestive modeling interface. The method consists of a method of a computer-implemented rendering of sketches, the method comprising the steps of: (1) a user activating a sketching application; (2) in response, the sketching application displaying on a screen a suggestive modeling interface; (3) the sketching application importing a sketch to the suggestive modeling interface; and (4) the sketching application retrieving from a database one or more suggestions based on the sketch.

In an aspect of the present invention, the method comprises user interactively using the sketching application to create a drawing that is guided by the imported sketch by selectively using one or more image guided drawing tools provided by the sketching application.

In another aspect of the present invention, the method comprises the sketching application iteratively retrieving from a database suggestions based on the drawing at one or more stages of the completion thereof, the suggestions consisting of images of previously used geometry stored to a database and matched to the drawing by operation of a matching operation of the sketching application.

In another aspect of the method of the present invention, the suggestions consisting of images of previously used geometry stored to the database and matched to the drawing by operation of a matching operation of the sketching application.

In one particular aspect of the present invention, the user can select particular suggestions or drawings generated using the sketching application that s/he wishes to store to the database so that it can be used as previously used geometry as set out above.

In yet another aspect of the present invention, the sketching application displays a predetermined number of suggestions on the same screen as a drawing interface provided by the suggestive modeling interface.

In a still other aspect of the present invention, a business method is provided whereby the sketching application is provided to a plurality of users; the template component of the application provides for the sale of a variety of type specific yet general pre-modeled components related to specific types of design projects (i.e., a residential building: a hospital or a office building for example). Said template database would be sold to the designers interested in using the specific modeling components for their specific projects. This would increase the efficiency of the design process.

In a still other aspect of the present invention, a business method is provided whereby the sketching application is provided to a plurality of users; the sketching application is linked to a server computer; the operator of the server computer engages with advertisers; whereby the server computer and sketching application are operable to cooperate so as to display in the suggestive modeling interface advertising selected based on the one or more stages of the completion of a drawing created by the user using the suggestive modeling interface.

The computer system comprises a computer that is linked to the computer program of the present invention. The computer program includes a sketching application that is operable to perform the functions of the method of the present invention on the computer. In another aspect of the computer program, the computer program also includes a translator for translating input files for processing by the sketching application and output files created by the sketching application.

BRIEF DESCRIPTION OF THE DRAWINGS

A detailed description of the preferred embodiments is provided herein below by way of example only and with reference to the following drawings, in which.

Figure 1:
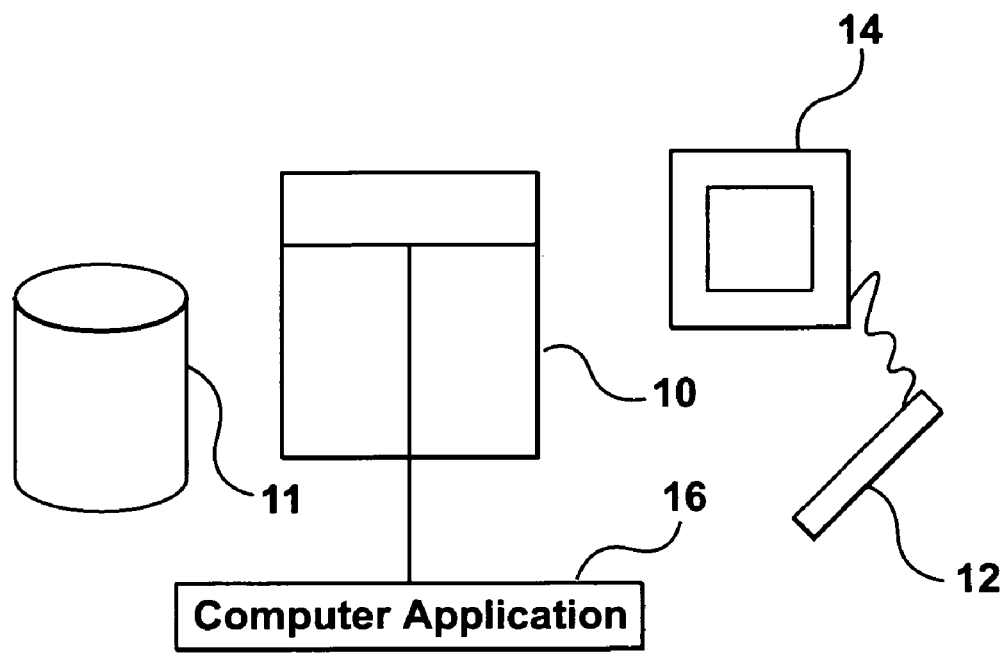
FIG. 1 illustrates a resource diagram of the system of the present invention, in one particular embodiment thereof.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

The system of the present invention, in one aspect thereof, is best understood as a computer-implemented system for rendering sketches. FIG. 1 illustrates a representative embodiment of the system that includes a computer 10, which computer generally consists of a personal computer including a lap top or table PC, provided that they have a suitable graphics card (not shown) and suitable graphics acceleration to process graphics as described below. The computer is preferably linked to a database 11. The primary input device is a pen 12 on a digitizing tablet 14 such as a WACOM™ tablet. The pen 12 preferably has a barrel button with two click actions—forward, backward, and an active eraser end. Loaded on the computer 10 is the computer application 16 of the present invention, which is the computer program aspect of the present invention. The computer application 16 consists of a special application three-dimensional modeling tool, programmed in a manner that is known, to include the functions described in this disclosure. The method of the present invention is particularized throughout the disclosure, and certain aspects of the method are summarized below under the heading "Business Method".

Figure 2:
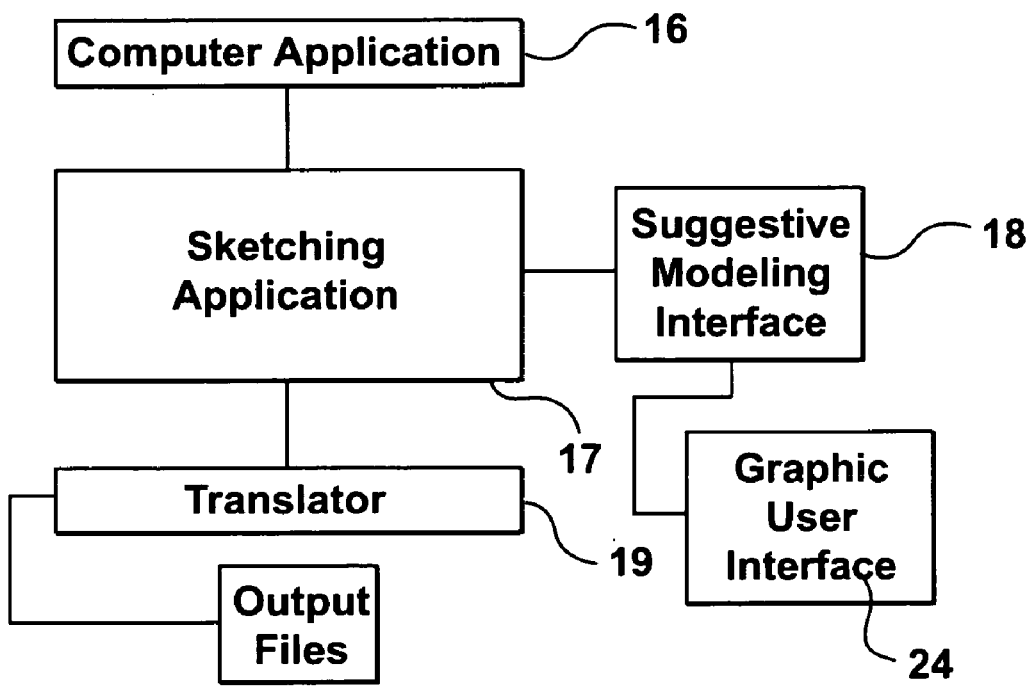
FIG. 2 is a resource diagram illustrating the resources of the computer program of the present invention, in one particular embodiment thereof.

As illustrated, for example, in FIG. 2, the computer application 16, in a particular embodiment thereof, includes a sketching application 17 and a translator 19. The sketching application 17 provides the suggestive modeling interface 18 that enables users to access the functions of the sketching application 17. The operations of the sketching application 17 are described below as functions embodied by the suggestive modeling interface 18 for the sake of illustration of the invention in operation. The sketching application 17 is best understood as incorporating certain features common to the three-dimensional model creations packages such as AutoCAD™ and others. The translator 19 is operable to convert drawing files for processing by the sketching application 17 as explained below, and also to convert drawings created by operation of the sketching application 17 into common file formats used by available three-dimensional model creation packages.

It should be understood that the sketching application 17 is not limited to a means for preparing drawings based on user's sketches, but as an example encompasses the gesture set recognition as discussed more fully below. In this regard, the sketching application 17 comprises a means for running a database query based on sketch input provided by a user.

As illustrated below, the present invention provides an image guided pen-based suggestive modeling interface 18 for sketching three-dimensional wire frame models using two-dimensional images of similar objects to serve as a guide to the user, rather than the user starting from a blank canvas. Although the present invention is well-suited for three-dimensional modeling using two-dimensional images, it should be expressly understood the present invention is not limited in that regard, encompassing two-dimensional modeling as well. For example, the gesture set recognition in accordance with the present invention is operable to produce two-dimensional suggestions based on the user-inputted sketches regardless of whether the end use comprises a three-dimensional model.

In one aspect of the method of the present invention therefore, a method is provided for creating three-dimensional models in an image creation interface that comprises the step of scanning a hand-drawn sketch and inserting the sketch in the image creation interface. In other words, the present invention contemplates commencement of the three-dimensional model creation workflow with a scanned image of one or more hand-drawn sketches rather than a blank canvas. The sketches, which are integrated into the three-dimensional modeling workflow, are used as guides for creation of new geometry, as particularized below. Specifically, the computer application 16 enables images of the sketches to be imported and placed on any of the three primary construction planes of the suggestive modeling interface 18. In one particular embodiment thereof, an aspect of the suggestive modeling interface 18 is that it is programmed to interoperate with the pen 12 to associate specific marks made on the tablet 14 using the pen 12 to support three interaction functions: snapping, pinning and gluing, as explained below. It should be understood that this, in turn, permits the pen 12 to be used in conjunction with the suggestive modeling interface 18 in such a manner that a wide range of marks (including various curves) made by the pen 12 are interpreted as drawing marks and not as queues for other interactions. This reduces ambiguity and maintains usability.

Summary of Suggestive Modeling Interface

Figure 3A:
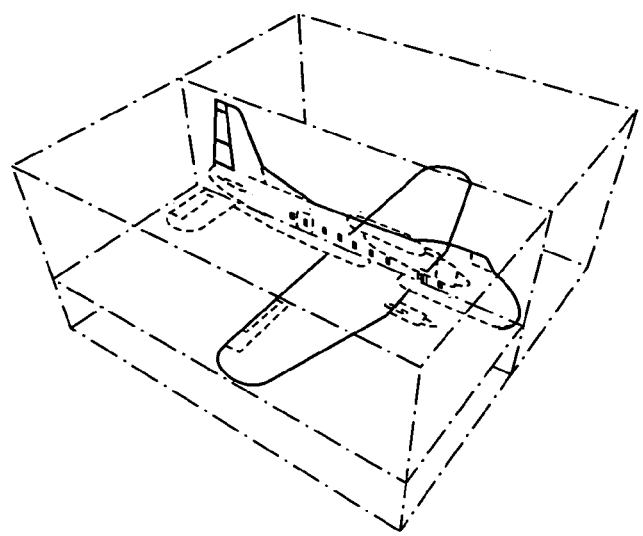
FIGS. 3a, 3b, and 3c illustrate one particular embodiment of the suggestive modeling interface, in which the functioning of the cuboid working volume is shown.
Figure 3B:
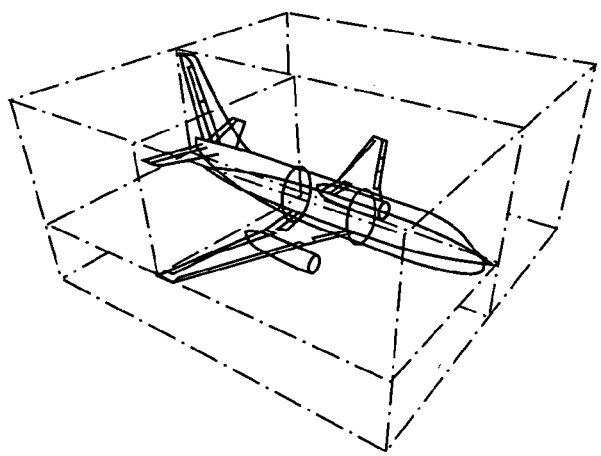
Figure 3C:
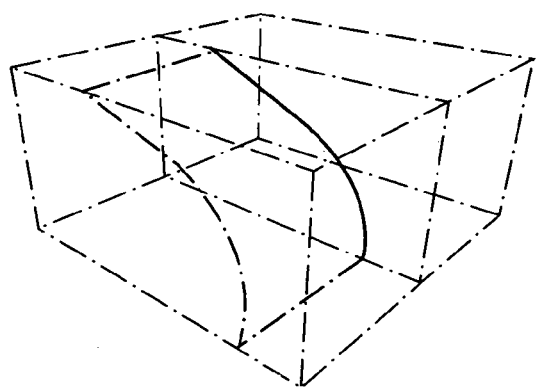
Figure 4A:
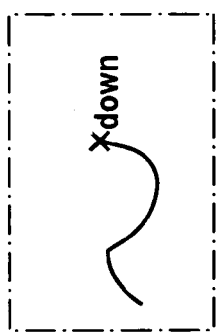
FIGS. 4a, 4b, 4c, 4d, and 4e illustrate curve drawing by operation of the suggestive modeling interface.
Figure 4B:
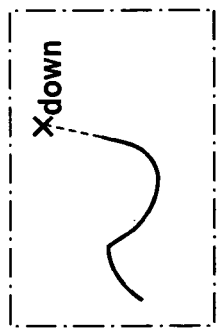
Figure 4C:
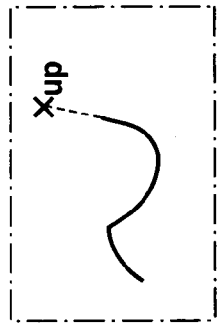
Figure 4D:
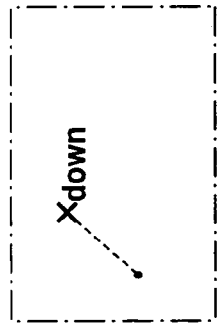
Figure 4E:
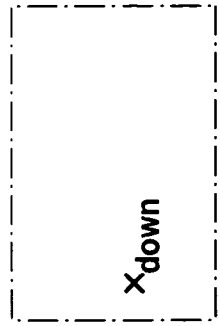

The suggestive modeling interface 18 therefore provides a spatially integrated plane that permits the creation of three dimensional models by a user using the pen 12 on the tablet 14 to provide inputs for drawing the relevant two-dimensional profile curves on orthographic construction planes from the three primary viewpoints: top, side, and front. Rather than viewing these construction planes in separate two-dimensional views as is typically done in three-dimensional modeling software, the construction planes of the present invention are integrated into a three-dimensional cuboid working volume 20, and can be moved within that volume to enable curve drawing at different locations, as illustrated in FIGS. 3a, 3b and 3c. This integration of the construction planes into a three-dimensional cuboid volume 20 provides the user with information on the correspondence between the different viewpoints without switching visual context. In addition to two-dimensional planar curves on the primary construction planes, the system also supports three-dimensional non-planar curves by projecting two-dimensional curves onto previously created three-dimensional surfaces in the scene.

In a particular aspect of the operation of the suggestive modeling interface 18, in a perspective view, camera tumbling and zooming is preferably performed (as an example) by using the arrow keys of a keyboard (not shown) that is linked to the computer 10, or by holding down a keyboard modifier key while moving the pen 12. Clicking the backward pen button with the cursor on a construction plane, transitions the cuboid working volume 20 to an orthographic view of that plane, and vice versa. All transitions are preferably animated to maintain continuity of context in a manner that is known.

Curve Drawing

Curves are used as the primary drawing primitive in the present invention, and all movements of the pen 12 by default are treated as curves. The suggestive modeling interface 18 preferably supports a series of particular curve drawing function. In a series of particular aspects of the operation of the suggestive modeling interface 18, this interface supports the following functions:

(1) A one handed version of the two hand tape drawing technique is used as described in "Interaction techniques for 3D modeling on large displays", Grossman, T. et al., 2001, ACM 13DG 1999 Symposium on Interactive 3D Graphics, p. 17-23, and "Creating principal 3D curves with digital tape drawing", Grossman, T. et al., 2002, ACM CHI 2002 Conference on Human Factors in Computing Systems, p. 121-128, for creating two-dimensional curves on the construction plane as illustrated in FIGS. 4a, 4b, 4c, 4d, and 4e. Specifically, this is achieved by the suggestive modeling interface 18 fixing the drawing vector's length to allow for one-handed operation.

(2) In curve drawing, all points of intersection with other curves in the scene are preferably highlighted to enable users to align new curves to existing ones.

(3) The suggestive modeling interface 18 is operable to be able to select feature curves for image matching (to provide suggestions as described below), segmentation, and filtering in a manner that is known.

(4) Active contour models or snakes are used to provide a framework wherein curves can evolve on images to track features based on energy minimization. This is provided in the manner that is known in the prior art.

(5) Intelligent "scissors" are provided by operation of the suggestive modeling interface 18 wherein users can interactively segment images. This is provided in the manner that is know in the prior art.

Curve Editing

The present invention supports several different ways to edit curves that preserve the fluidity of the graphic user interface 24. To edit a curve, the suggestive modeling interface 18 selects a particular curve using the "stroke" gesture described below. Once a curve is selected, touching the pen 12 on the selected curve's construction plane without intersecting the curve itself invokes the pinning editing operation. Curve editing is best understood by reference to the following Figures: FIGS. 5a, 5b, 5c, 5d, 5e, 5f, 5g, 5h, 5i, 5j, 5k and 5l.

If the tip of the pen 12 intersects the selected curve, a new curve or straight line can be drawn using the standard curve/line drawing technique. When the new curve has been drawn it will be merged into the selected curve in one of two ways, depending on where the starting point of the new curve intersects the originally selected curve:

(1) If the starting point of the new curve is on one of the ends of originally selected curve, it is assumed that the user wishes to extend the selected curve. The two curves are thus merged. It should be noted that the act of drawing the new curve could trigger suggestions.

(2) If the starting point of the new curve intersects some other part of the originally selected curve, it is assumed that the user wishes to edit a midsection of the curve, beginning at the intersection point. The closest point on the original curve to the final endpoint of the new curve is determined, via the suggested curve and the new curve is this smoothly incorporated into the original curve, displacing the unwanted segment. Cut and delete gestures can also be used for editing.

Gestures

Figure 6A:
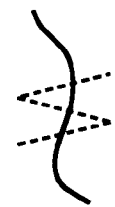
FIGS. 6a, 6b and 6c illustrate the pen gestures of the present invention, in one particular aspect of the suggestive modeling interface.

As stated earlier, by default, all pen 12 stroke inputs to the system are treated as curve and line drawings. However, when the user presses hard on the pen tip (e.g., in one particular embodiment of the invention if the pressure exceeds a threshold of 800 out of 1024 units), it is assumed that gestural commands are being input. In a particular aspect of the operation of the suggestive modeling interface 18, the interface in operation preferably supports the following gestures:

(1) Stroke. The stroke is a simple straight line gesture used for selecting/deselecting curves and construction planes, illustrated in FIG. 6a. In perspective view of the working volume 20, a stroke that intersects any curve in the scene makes that curve and its associated construction plane active. Once active, in operation, the suggestive modeling interface 18 allows the curve to be edited, or moved by moving its plane. A stroke that intersects a suggested curve (described below) confirms the inclusion of that curve into the scene. A stroke that intersects one of the edges of a bounding cuboid in the working volume 20 will generate a new active construction plane in the appropriate dimension depending on the intersected edge. A stroke that does not intersect any edge or curve will deselect the currently selected curve, if any. In an orthographic view (i.e. when drawing), strokes are only recognized when they intersect curves that lie on the currently active plane. This is to avoid inadvertent switching to another construction plane.

Figure 6B:
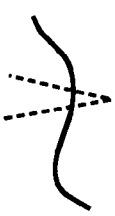

(2) Cut. The cut gesture is a v-shaped two-segment gesture, as illustrated in FIG. 6b. When the cut gesture intersects a scene curve, the curve is cut into two segments at the intersection point. In perspective view of the working volume 20, cut gestures can be applied to any scene curve, whereas in orthographic view cutting is limited to curves on the currently active construction plane. Cut gestures cannot be applied to suggested curves that have yet to become a permanent part of the scene.

Figure 6C:
Figure 5A:
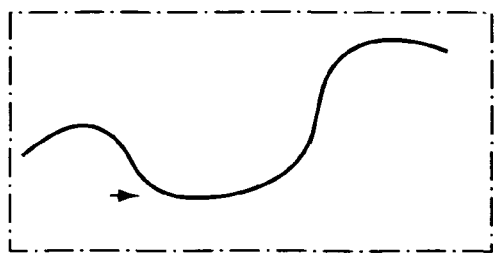
FIGS. 5a, 5b, 5c, 5d, 5e, 5f, 5g, 5h, 5i, 5j, 5k and 5l illustrate curve editing, by operation of the suggestive modeling interface.
Figure 5B:
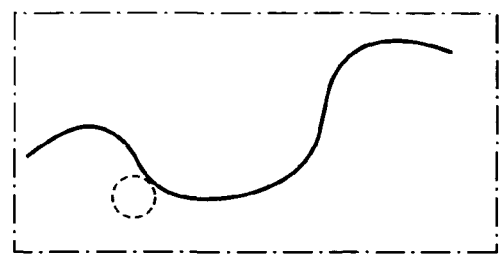
Figure 5C:
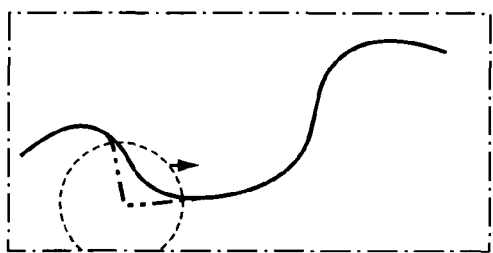
Figure 5D:
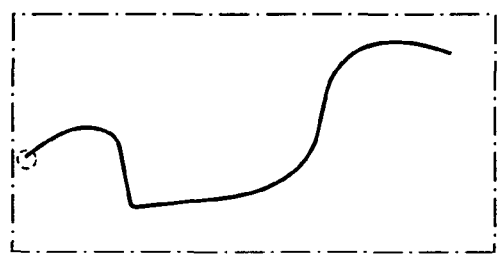
Figure 5E:
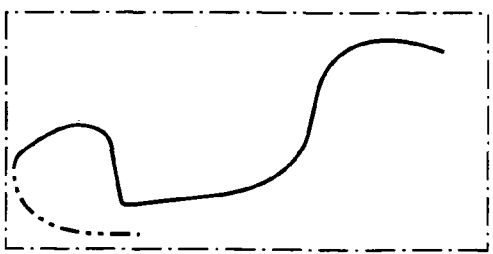
Figure 5F:
Figure 5G:
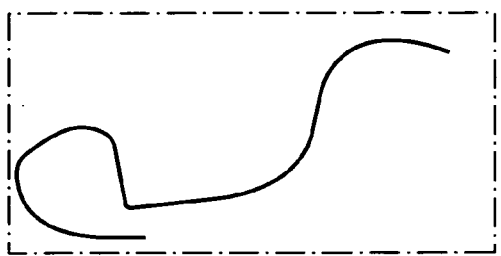
Figure 5H:
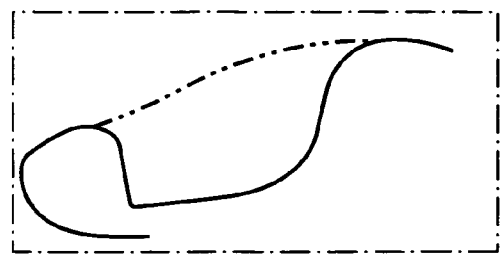
Figure 5I:
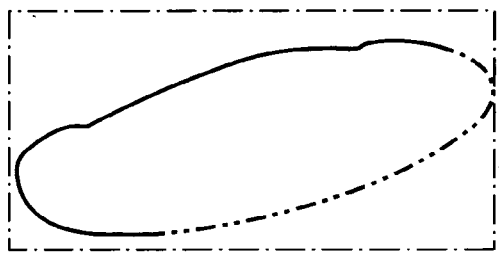
Figure 5J:
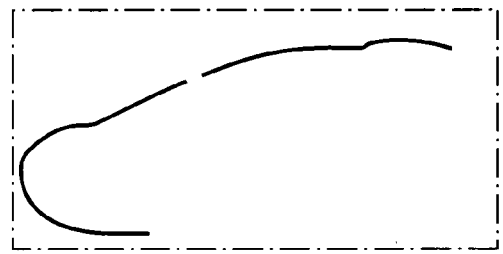
Figure 5K:
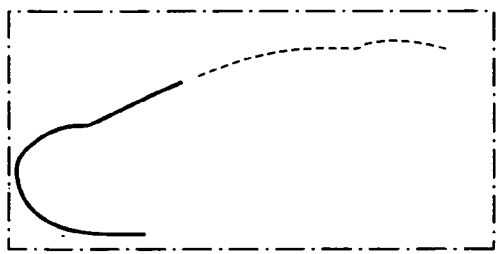
Figure 5L:
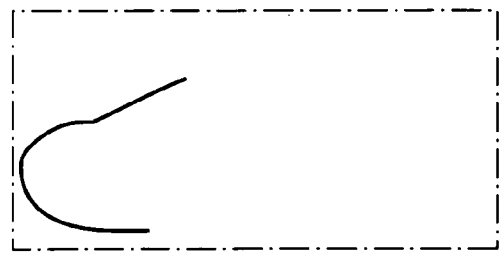

(3) Delete. The delete gesture is an N-shaped three-segment gesture, as illustrated in FIG. 6c. In perspective mode, a delete gesture that intersects any curve, including suggested curves, deletes that curve from the scene. In orthographic view, only curves in the active construction plane can be deleted.

Image Guided Drawing

As stated earlier, the suggestive modeling interface 18 permits the integration of scans of concept sketches into the three-dimensional modeling workflow, and specifically the use of such sketches as guides for the creation of new geometry. Also as stated earlier, the suggestive modeling interface 18 permits the images of sketches to be imported and placed on any of the three primary construction planes provided by the working volume 20. Once loaded, in another particular aspect of the suggestive modeling interface 18, these images can be used to influence the shape and position of drawn curves, using three interaction techniques: snapping, pinning and gluing. Presently, the state of the art does not support loading images onto arbitrarily shaped construction surfaces that can be defined by the user for non-planar three-dimensional curve creation. However, it would be obvious to incorporate this function into the suggestive modeling interface 18 of the present invention once techniques or utilities that provide this function are available. The functions of snapping, pinning and gluing are described in greater detail below.

Figure 7A:
FIGS. 7a and 7b illustrate the snapping functions of the present invention.
Figure 7B:
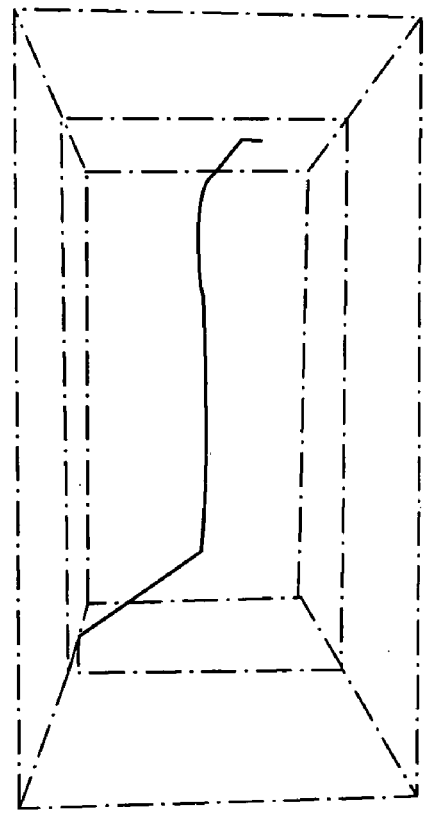
Figure 8A:
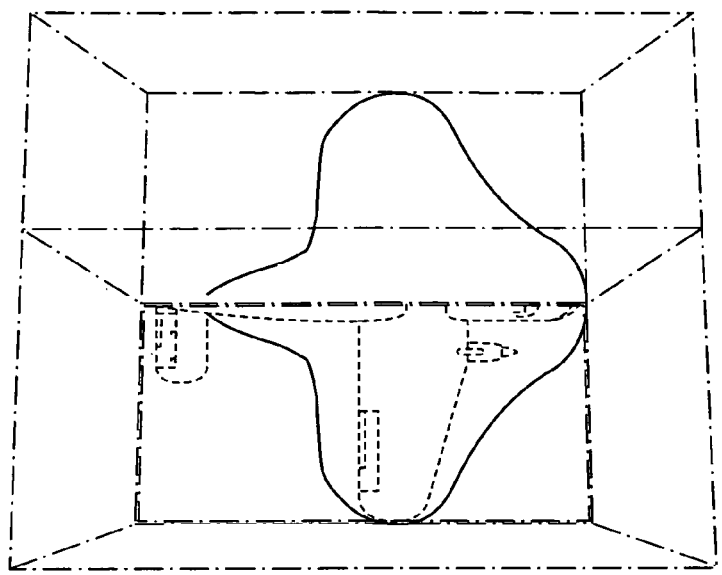
FIGS. 8a, 8b, 8c, 8d, 8e and 8f illustrates the functions of the suggestive modeling interface that enable a user to minimize the energy of sketches.
Figure 8B:
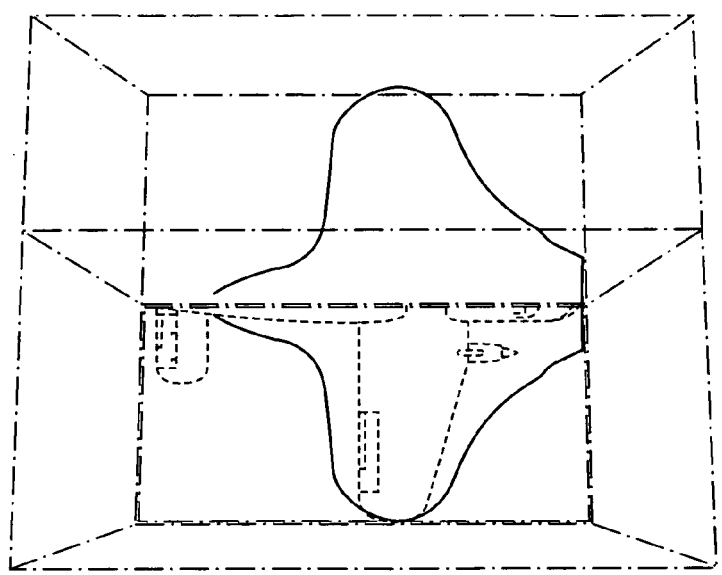
Figure 8C:
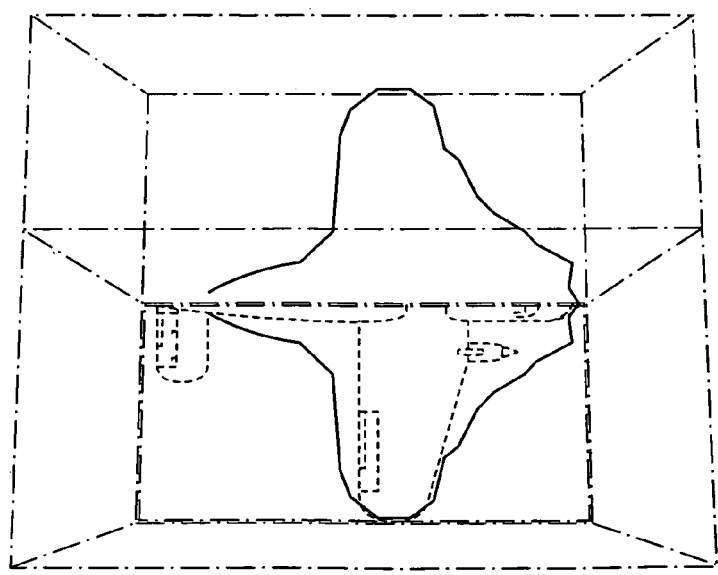
Figure 8D:
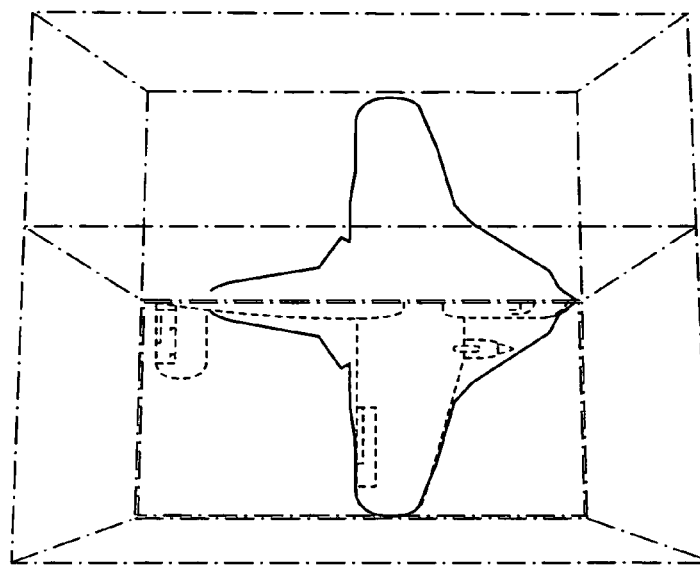
Figure 8E:
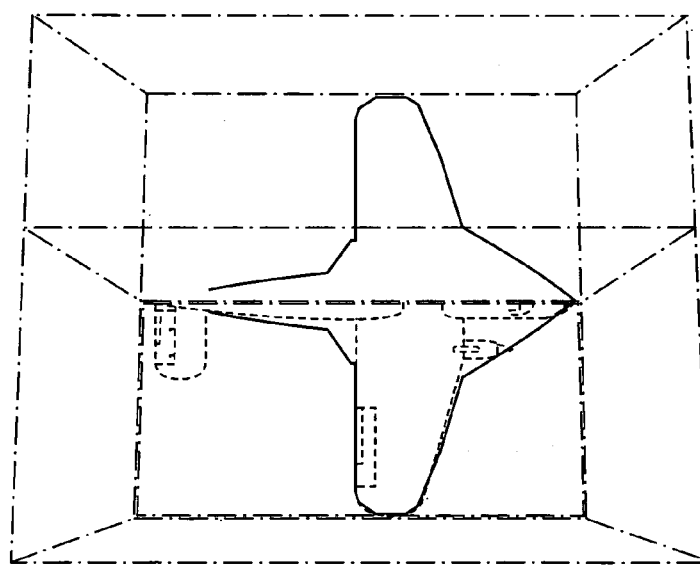
Figure 8F:
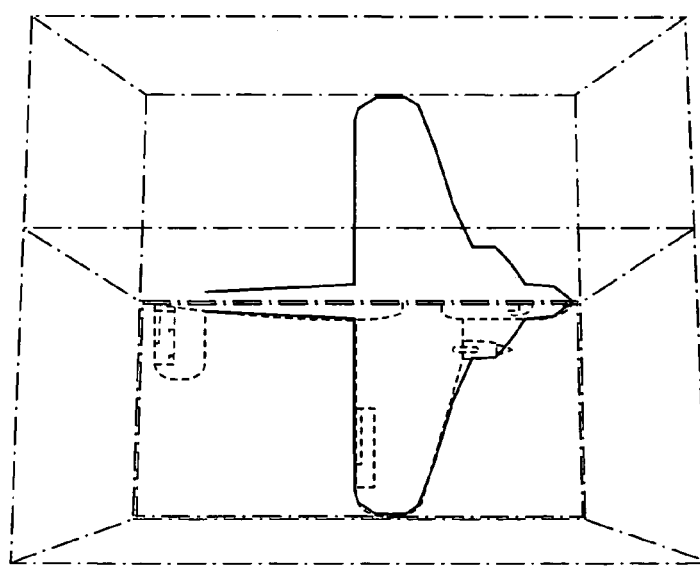
Figure 9A:
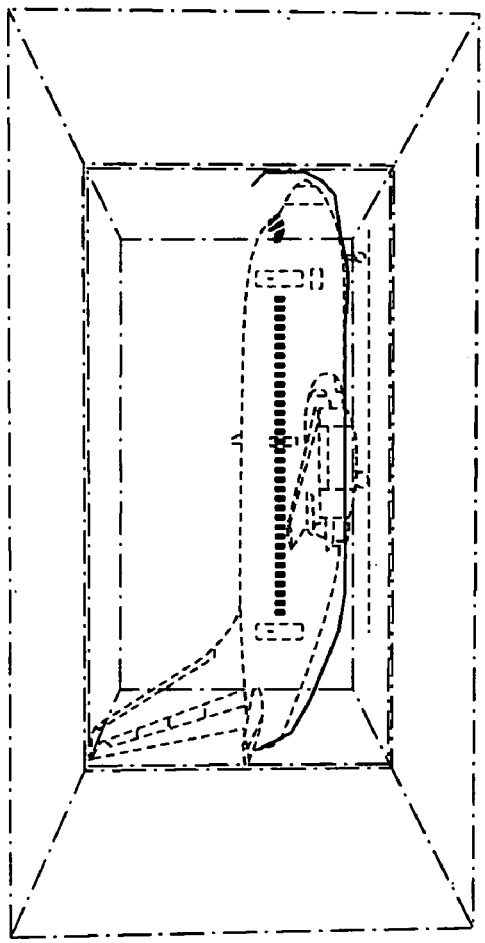
FIGS. 9a, 9b, 9c, and 9d illustrate the gluing functions of the suggestive modeling interface.
Figure 9B:
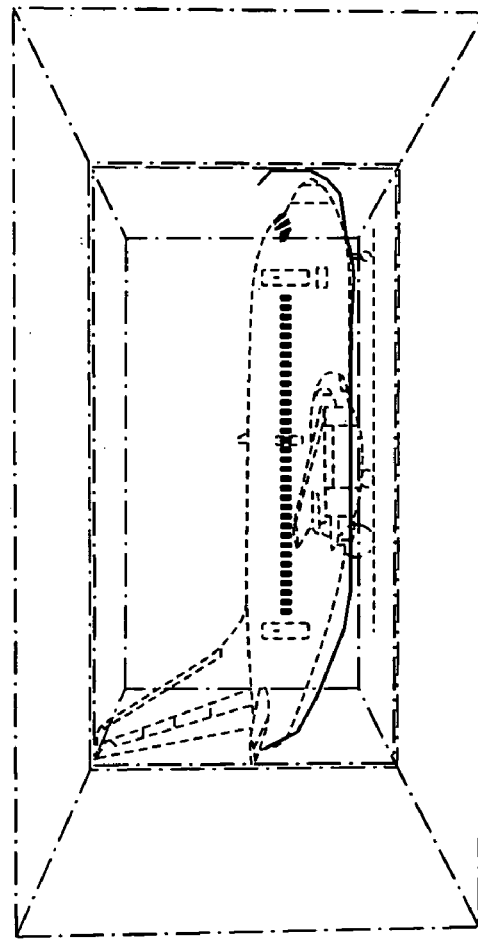
Figure 9C:
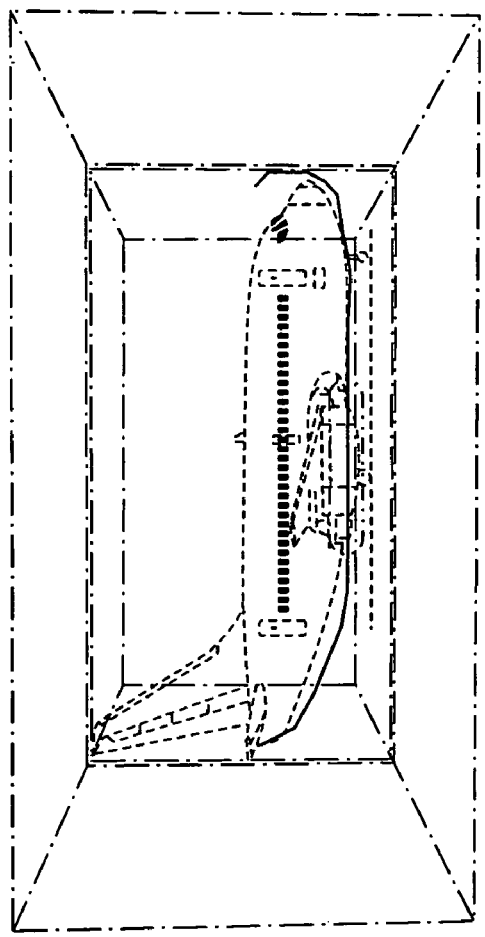
Figure 9D:
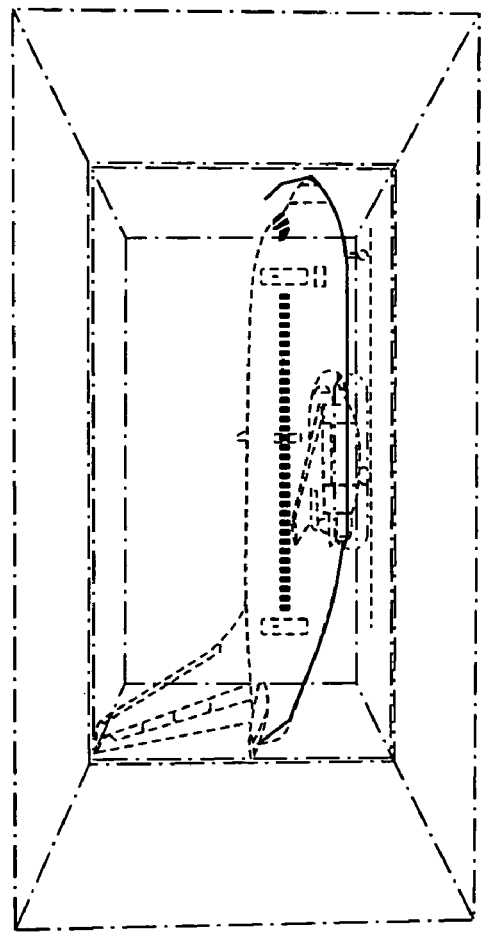

(1) Snapping. When an image is loaded into a construction plane of the working volume 20, image maps are preferably created for various image attributes, in a manner that is known and by operation of the suggestive modeling interface 18. Since the images are often concept line sketches with lines built from multiple strokes, the suggestive modeling interface 18 is operable to filter the images to remove "noise" in sketch stroke and intensity as best illustrated in FIGS. 7a and 7b. Continuous intensity maps are then created by the suggestive modeling interface 18 in a manner that is known by letting particular strokes "bleed" intensity value into neighboring regions by engaging a routine that accomplishes reaction diffusion in relation to the particular strokes. Minimize Energy. The next step, in one particular embodiment of the invention, is to iteratively move and resample points on the sketched curves (if necessary) to minimize their overall energy so as to permit the sketched curves (for example) to be brought to conformity with selected image lines as illustrated in FIGS. 8a, 8b, 8c, 8d, 8e and 8f. In another aspect of the suggestive modeling interface 18, as illustrated in these Figs., the active contour model defines the energy of a "snake" type curve as a combination of internal curve energy and external energy resulting from image guides and user constraints. The internal energy is a measure of bending and stretching of points on the curve and can be reduced by Laplacian smoothing and arc-length minimization, in a manner that is known. The image energy at a point on the curve is a measure of various image attributes in a localized region of the image around the point. Attributes such as image intensity attracts curves to light or dark areas, image gradient attracts a curve to sharp edges. The individual energy terms in a system are under user control via gluing and pinning techniques, as particularized below. Roughly sketched curves can thus be quickly smoothed, re-sampled, and attracted to underlying image features.

(2) Gluing. It is often desirable to constrain parts of a drawn curve from being affected by the image snapping algorithm. The invention achieves this goal via a "gluing" operation of the computer application initiated by operation of the suggestive modeling interface 18, which is performed by drawing along the curve using the eraser end of the stylus (i.e., flip the stylus), as best illustrated in FIGS. 9a, 9b, 9c, and 9d. Parts of the curve that lie within the glued area remain invariant while the rest of the curve is attracted to the plane's underlying image. Although this gluing technique was designed to support image guided drawing, the technique is useful when editing curves directly, without running the image snapping algorithm, which is a known algorithm.

Figure 10A:
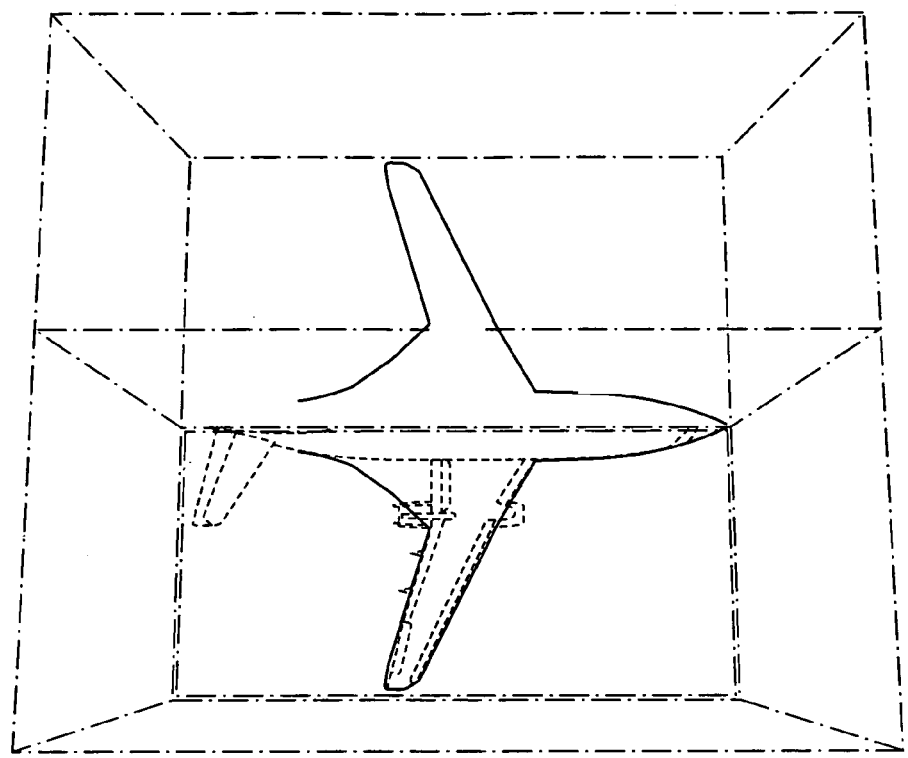
FIGS. 10a, 10b, 10c, 10d illustrate the pinning functions of the suggestive modeling interface of the present invention.
Figure 10B:
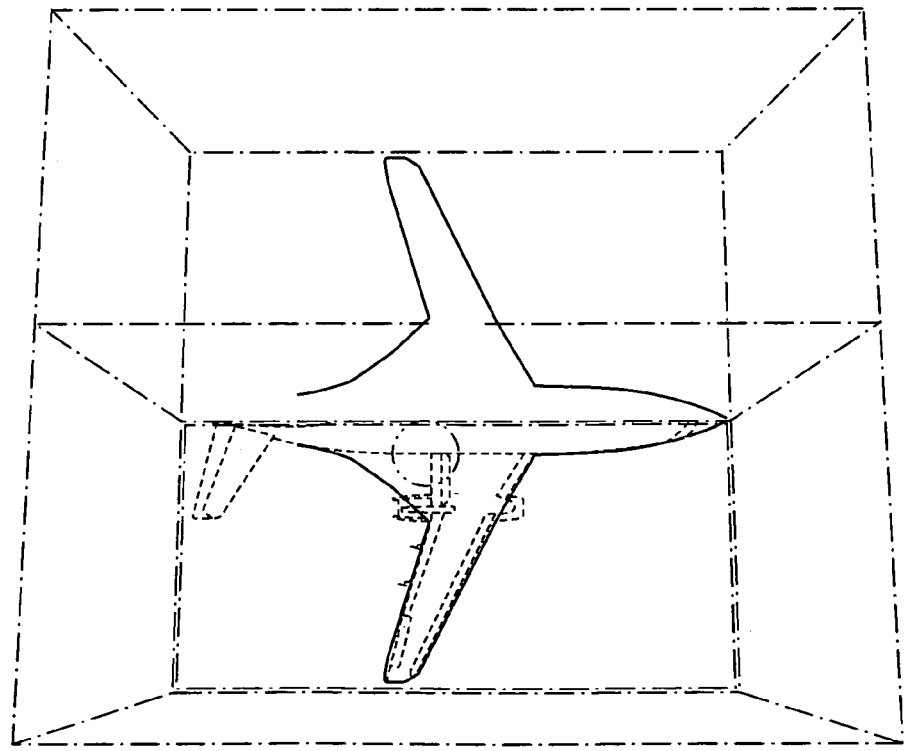
Figure 10C:
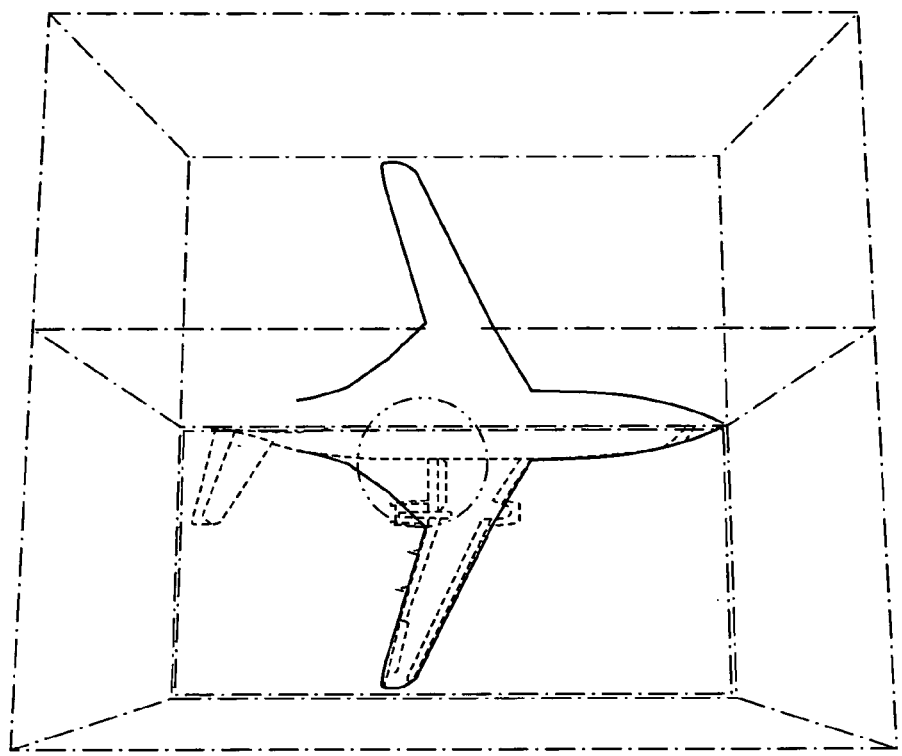
Figure 10D:
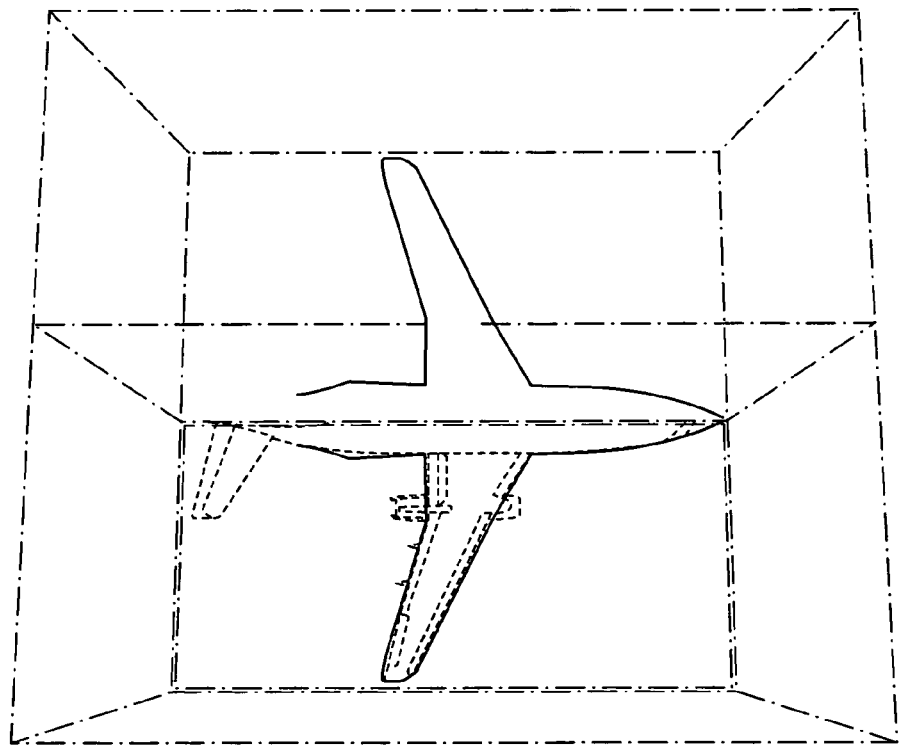
Figure 11A:
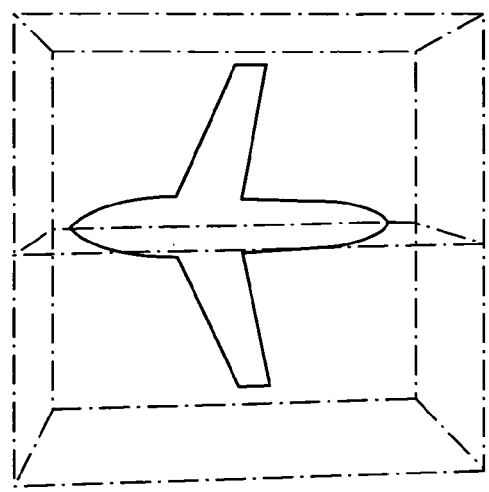
FIGS. 11a, 11b, 11e, 11d, and 11e illustrate the function of the suggestive modeling interface whereby suggestions of previously used geometry are provided by the computer program of the present invention.
Figure 11B:
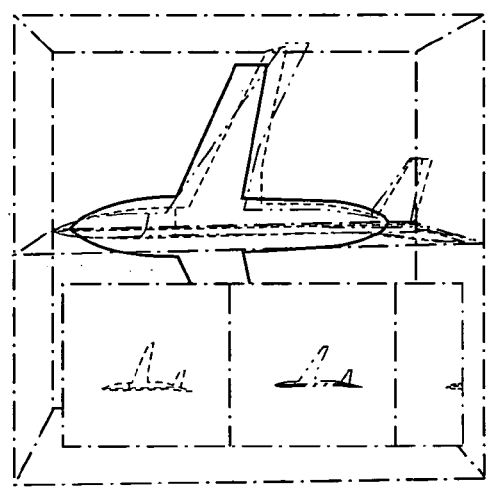
Figure 11C:
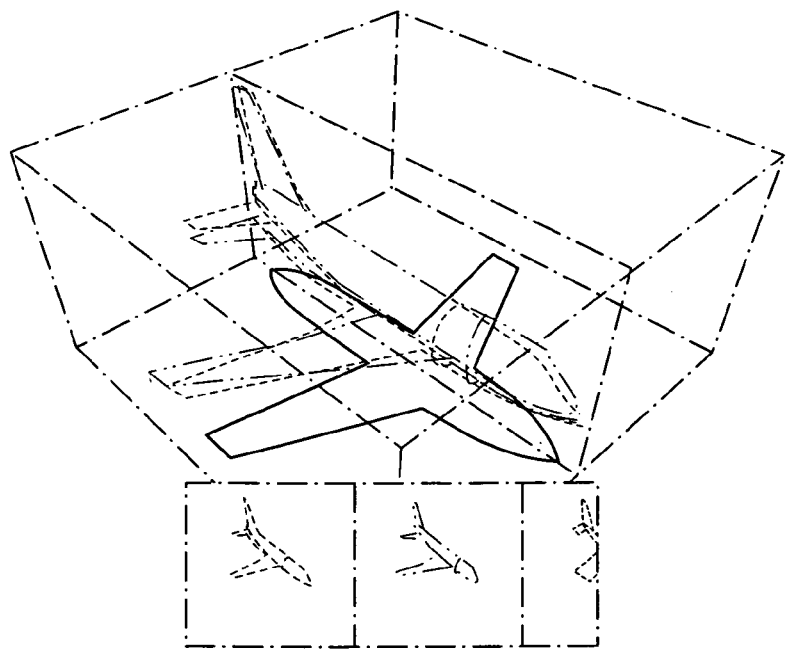
Figure 11D:
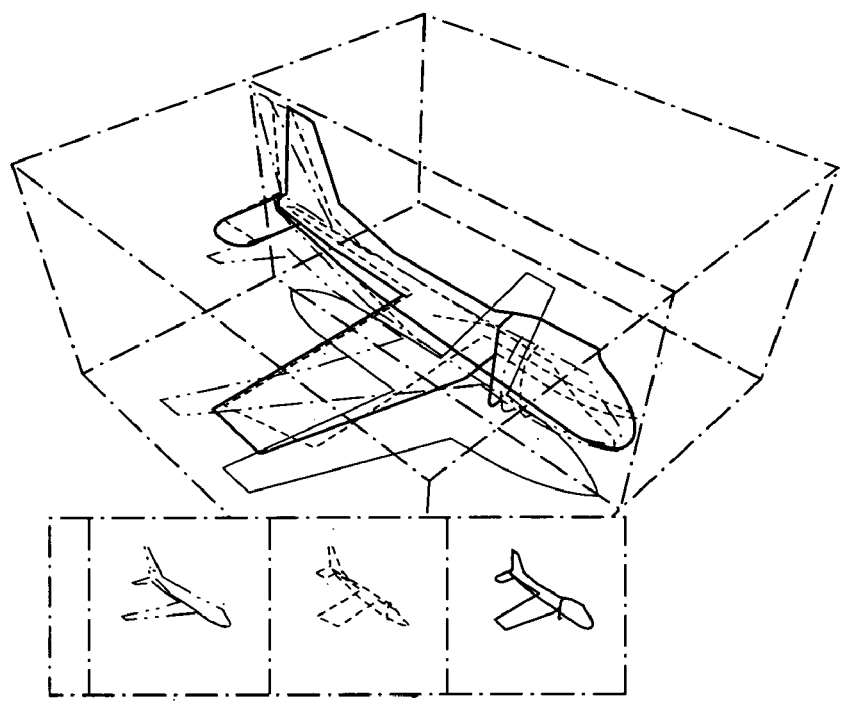
Figure 11E:
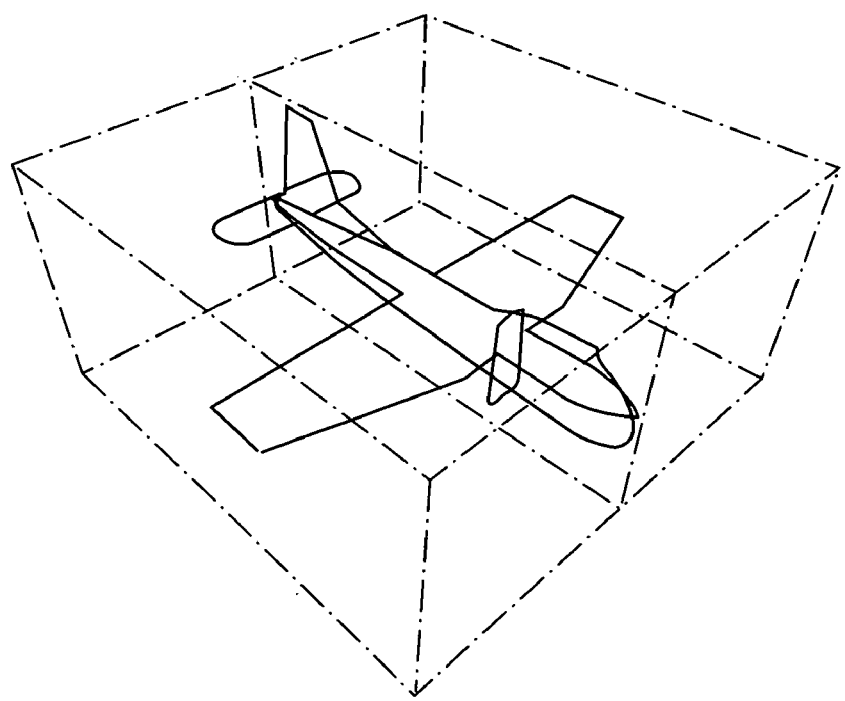
Figure 12B:
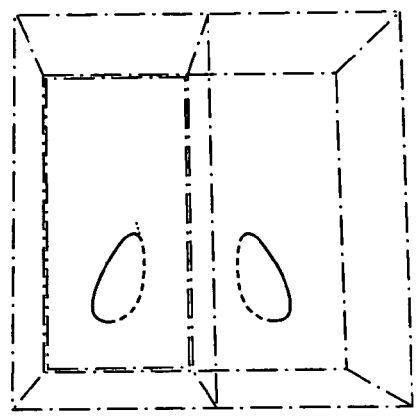
FIGS. 12a, 12b, 12c, 12d illustrate a particular suggestive operation of the suggestive modeling interface of the present invention, wherein closure suggestions are provided.
Figure 12D:
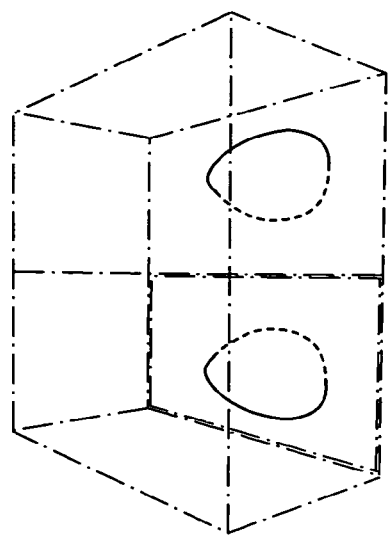
Figure 12A:
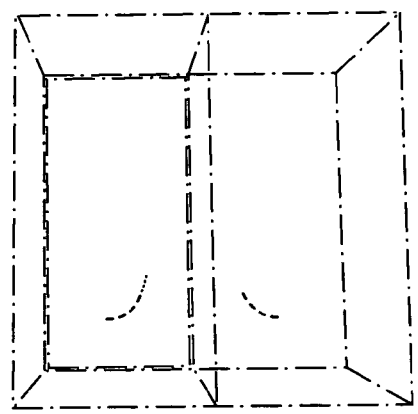
Figure 12C:
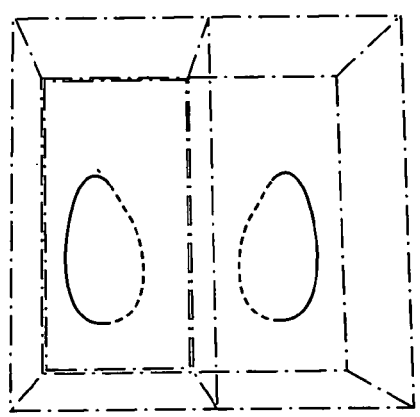
Figure 13A:
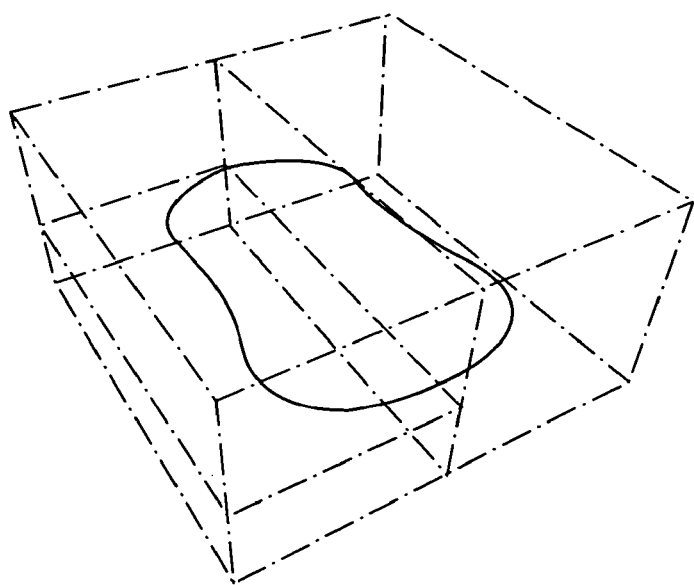
FIGS. 13a, 13b, 13c, 13d, 13e, and 13f illustrate a particular suggestive operation of the suggestive modeling interface of the present invention, wherein extrusion suggestions are provided.
Figure 13B:
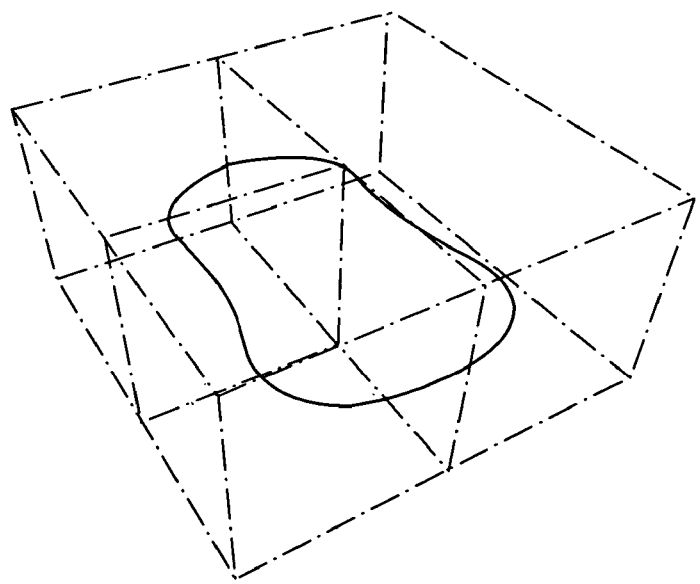
Figure 13C:
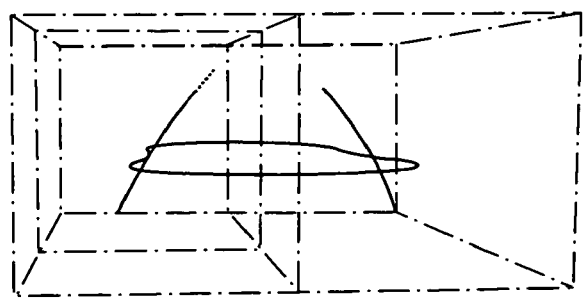
Figure 13D:
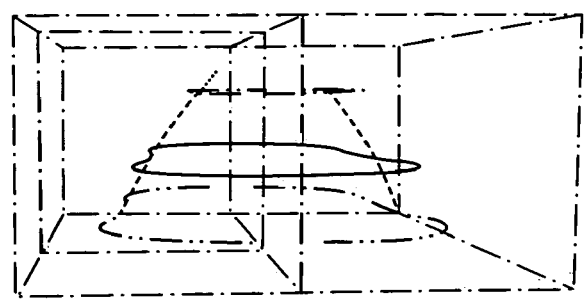
Figure 13E:
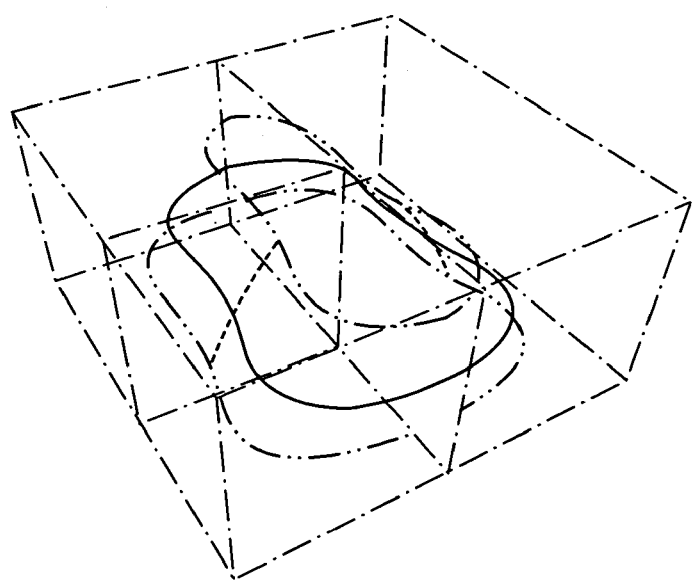
Figure 13F:
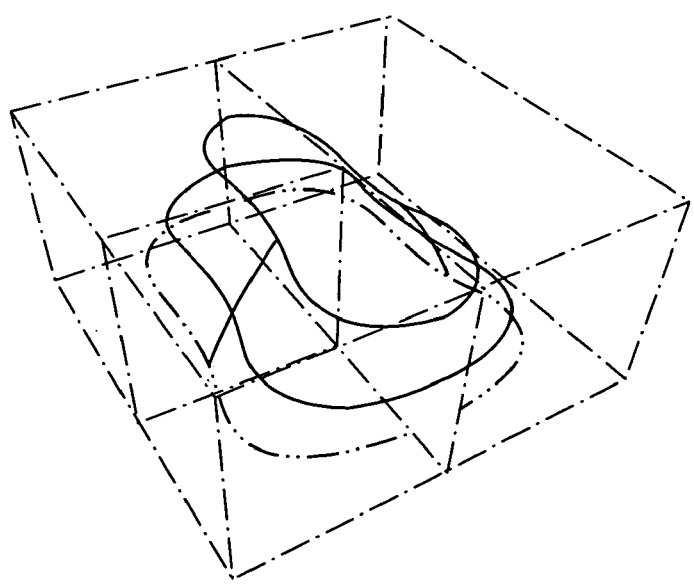

(3) Pinning. It is found to be useful to specify a point on the image that the drawn curve should pass through. The invention achieves this goal through a "pinning" operation of the computer application 16 that is also initiated by operation of the suggestive modeling interface 18 to support this functionality, as illustrated in FIGS. 10a, 10b, 10c and 10d. In a particular embodiment of this pinning operation, a drawn curve is first selected, and a pin point is specified by pressing the pen 12 down on the construction plane. Dragging the tip away from the pin point adjusts the area of influence of a subsequent attractor algorithm provided in a manner that is known. This area of influence is a circle centered at the pin point with radius equal to the distance from the cursor to the pin point. Parts of the curve that lie within this area behave like a rubber band being pulled to the pin point as illustrated in FIG. 10c in particular. It should be understood that pinning can also be used independently of image snapping.

Suggestions

It should be understood that the suggestive modeling interface 18 of the present invention (based on the functions and operations described above) permits a user to create a drawing that is an approximate guide to creating a final three-dimensional model, wherein images (of sketches and/or suggested images from the database 11 selected from a set of images matched using a matching routine 22 of the present invention, as described below) can be used to selectively influence curves that are part of the three-dimensional model creation workflow.

When the user is drawing curves throughout the workflow described thus far in the disclosure, the computer application 16 of the present invention is operable to provide ongoing suggestions of possible geometry that can be quickly used without the need to draw that geometry. The suggestions are inferred from characteristics of the currently drawn curve. The invention makes use of the matching routine 22 that is based on curve matching. In one particular aspect of the present invention the matching routine 22 incorporates a curve matching algorithm that enables the computer 10 to seamlessly augment basic suggestions within more complex ones from the database 11, wherein the database is populated with previously used geometry. As stated earlier, the suggestive modeling interface 18 enables gestural command input, and interaction techniques for camera controls that enable smooth transitions between orthographic and perspective views. The drawings created using the sketching application 17 and the previously used geometry preferably incorporate metadata (in a manner that is known) that enable these matching functions. These aspects of the suggestive modeling interface 18 enable the suggestions provided based on the matching routine 22 to selectively influence curves that are part of different aspects of the three-dimensional model creation workflow.

A particular aspect of the present invention, is a particular mode for displaying the described suggestions in the graphic user interface 24 provided by the suggestive modeling interface 18, for example, on a display screen (not shown) associated with the computer 10. In one particular aspect of the present invention, the top three candidate suggestions identified by the matching routine 22 (identified as particularized below) are displayed in a separate location on the screen but part of the same viewing space as the model being created, as illustrated in FIG. 2. This reduces the need for the user to switch their focus of attention between viewing suggestions and drawing curves.

The matching routine 22 is designed to provide "approximate" matches rather than exact matches, thereby enabling the suggestive modeling interface 18 to provide suggestions (consisting of previously used geometry extracted from the database 11) as possible shortcuts in the three-dimensional model creation workflow, including in some cases images that contain useful image components, whereas the image overall is quite different from the model being created.

In one particular aspect of the present invention, the database 11 includes previously created geometry that has been explicitly saved by the user to provide suggestions for future drawings.

In a particular embodiment of the present invention, geometry in the database 11 is preferably processed to create a set of curve signatures. Curve signatures are created, in a manner that is known, by deconstructing the model curves into a network of tangent continuous curve segments. For example, as illustrated in FIGS. 11a, 11b, 11c, 11d, and 11e, half of the curve of the airplane fuselage is segmented into five pieces with three relatively straight curves defining the wing. The lengths of these curve segments are normalized with respect to the overall length of the model curves and stored along with their mean curvature and relative orientation to each other.

The curve-signatures thus provide a scale invariant representation of geometry in the database 11.

When new curves are drawn, their curve signature is matched against those in the suggestion database 11 by operation of the matching routine 22. The matching routine 22 is operable to compute a correspondence between the drawn curve segments and those in the database 11 by graph matching in a manner that is known. An overall match distance is then computed by the matching routine 22 based on the difference in length, orientation, and then compounded by the difference in length, orientation, and curvature of corresponding curve segments. Match distances less than a specified threshold are displayed as suggestions. As explained above, up to three top ranking matches are presented as suggestions to the user, within the working cuboid. This number and other attributes of the suggestive modeling interface 18 can be adjusted by a user by operation of a preferences utility (not shown), in a manner that is known. In addition, other lower-ranking matches can also be browsed, for example, using a widget that appears at the bottom of the screen. Should the user decide to increase the rank of one of the lower ranking suggestions, they simply click on that suggestion in the widget and it will appear within the working cuboid.

It should be understood that in one particular aspect of the present invention, unused suggestions preferably fade away after a ten second time interval. This avoids burdening the user with explicitly dealing with unwanted suggestions as they proceed with their work. This accept/delete/ignore interaction is used for all suggestions provided by operation of the present invention.

These database suggestions effectively allow users to seamlessly leverage off previously created geometry, without having to explicitly browse or import them from the file system in a traditional manner.

The matching routine 22 is further operable to provide algorithmically generated suggestions that infer simple subsequent geometry possibilities, such as for example closure and extrusion suggestions:

(1) Closure Suggestions. When a curve has been drawn beyond a certain length and is not relatively straight, a curve is suggested that closes the newly drawn curve, as shown in FIGS. 12a, 12b, 12c, and 12d. Straightness is determined by iterating through the points of the newly drawn curve and summing the absolute angles between successive points. If the resulting sum is greater than a predetermined threshold (70 degrees in one particular embodiment of the invention) then a closing curve is suggested. The suggested curve can be accepted into or deleted from the scene using the stroke and delete gestures respectively.

(2) Extrude Suggestions. When a newly drawn curve intersects with another existing curve on a different axial construction plane, then an extrusion is suggested. The suggested extrusion curves represent intersected curve translated to two endpoints of the recently drawn curve. If necessary, the suggested curves are also cropped to keep them within the cuboid working volume. This particular function of the present invention is illustrated by FIGS. 13a, 13b, 13c, 13d, 13e, and 13f.

Scale

In another aspect of the present invention, it should be understood that as a user creates a drawing using the suggestive user interface 18, the absolute scale of the gesture set can be calculated. This permits a refined search of the database 11 with the addition of scale as an attribute for matching.

As an example, the tracing of a photograph of known attributes provides for the introduction of scale as part of the matching of suggestions.

The addition of absolute scale as an attribute of the gesture set may significantly limit the set of possible suggestions improving the accuracy and utility of the matching routine 22. The addition of scale recognition permits the systematic scanning of large vector files for discrete sub-assemblies within larger assemblies, for example.

Further, sketching to scale would permit the tracing of a bitmapped photographic image allowing the matching routine 22 to search the database 11 for images having similar scaled pixel/vector set pairings. Therefore, with pen-based gestures a user is able to search through a number of images.

Method

The method of the present invention includes: (1) a user (designer) activating a sketching application; (2) in response, the sketching application displaying on a screen a suggestive modeling interface; (3) the sketching application importing a sketch to the suggestive modeling interface; and (4) the sketching application retrieving from a database one or more suggestions based on the sketch.

In an aspect of the present invention, the method comprises a user interactively using the sketching application to create a drawing that is guided by the imported sketch by selectively using one or more image guided drawing tools provided by the sketching application.

In another aspect of the present invention, the method comprises the sketching application iteratively retrieving from a database suggestions based on the drawing at one or more stages of the completion thereof, the suggestions consisting of images of previously used geometry stored to a database and matched to the drawing by operation of a matching operation of the sketching application.

In yet another aspect of the present invention, the sketching application displays a predetermined number of suggestions on the same screen as a drawing interface provided by the suggestive modeling interface.

In one particular aspect of the present invention, the user can select particular drawings generated using the sketching application 17 that s/he wishes to store to the database 11 so that it can be used as previously used geometry as set out above.

Business Method

In one aspect of the present invention, it should be understood that the database 11 can be linked to a server computer (not shown), whereby the suggestive modeling interface 18 is loaded on a local computer 10, and wherein the suggestive modeling interface 18 is operable to interact with a server application (not shown) linked to the server computer so as to retrieve from the remote database 11 the suggestions described above. The database 11 can be populated by its operator to provide the suggestions described as a billable service. Alternatively, the sketching application 17 is provided to clients (possibly free of charge or for minimal consideration), however, viewing of suggestions over a certain number of "freebie" suggestions will require a charge.

In this way, the method of the present invention can be understood as a link between product and service suppliers and designers. For example, the database 11 can be populated with previously used geometry useful to an architect designing a house. In this particular embodiment of the present invention, a user creating a sketch that suggests a door will be provided with suggestions of various doors, and the user can select a particular suggestion and incorporate the drawing associated with the particular suggestion thereby enabling more efficient creation of a plan for or drawing of a building.

Therefore, designers automatically develop accurate cost estimates and specifications in real-time during the design process, and consequently places designers back in control of the product delivery process.

Figure 14:
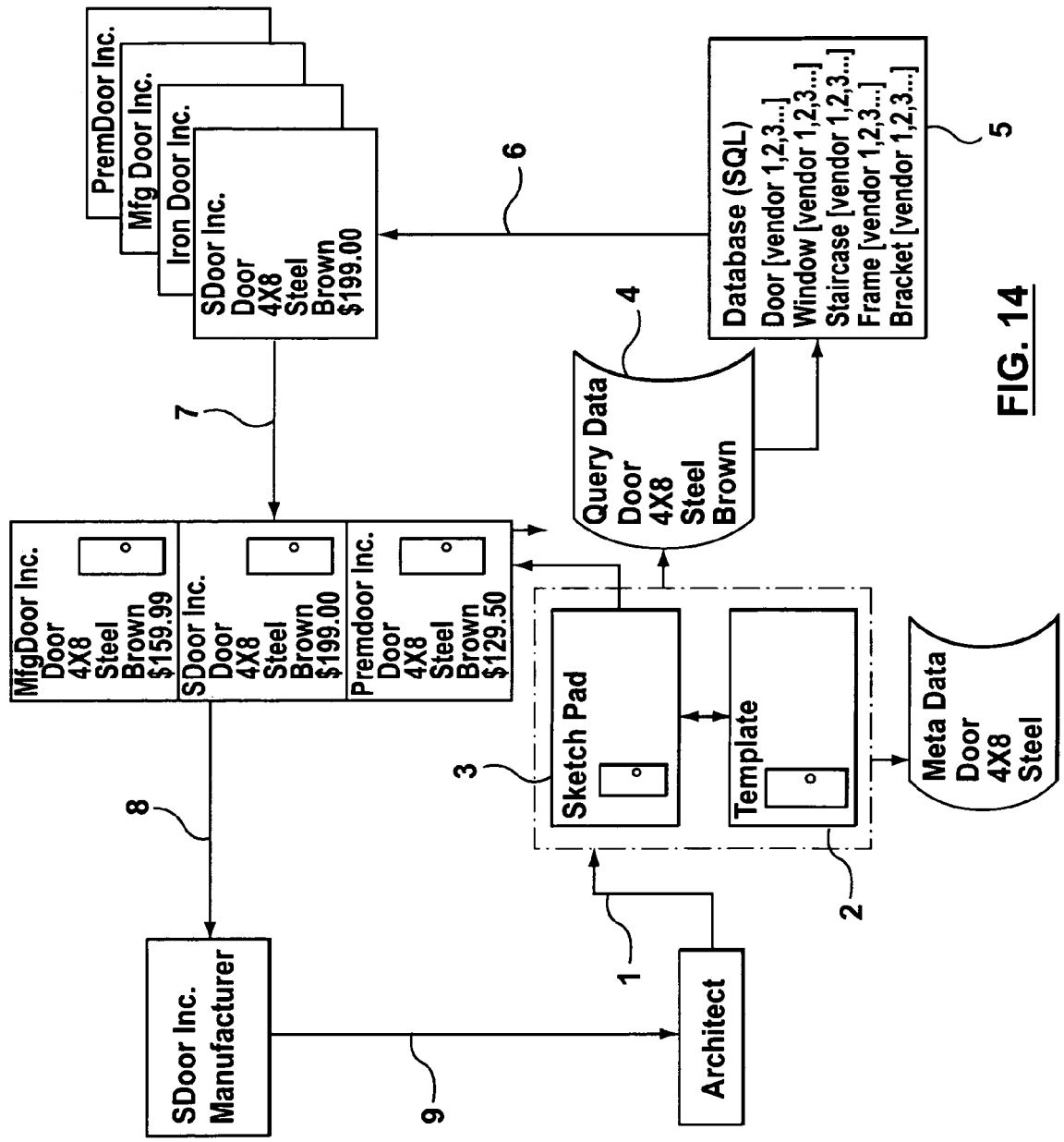
FIG. 14 is a system resource flowchart illustrating another aspect of the system of the present invention.

In another particular aspect of the present invention that is illustrated in FIG. 14, once a drawing is created using the sketching application 17 of the present invention, the sketching application 17 is operable to connect to the server computer 26 so as to retrieve advertising information associated with advertisers having a relationship with the operator of the server computer, the advertising being associated with the drawing created using the sketching application 17. For example, in the architect embodiment of the present invention, upon selecting the pre-existing geometry of a door, is provided with a range of options in the graphic user interface 24 that correspond with actual doors from suppliers having a relationship with the operator of the server computer. Based on a GOOGLE™ search model, the advertisers can contract for not only advertising, but a higher ranking.

Additional Implementations

The present invention relates to the computer-implemented rendering of sketches, comprising retrieving from a database one or more suggestions based on the sketch. The automated return of suggestions by a computer system based on the recognition of a pen-based gesture sets is useful for many applications and the present application contemplates other implementations, including:

- Aerospace, automotive, electronics design, mechanical engineering all rely on the use of abstract graphic conventions in the design of three-dimensional objects and assemblies of objects. The present invention can be utilized, as in architectural design example, with the introduction of specific template database files specific to each sector/industry.
- The present invention could be utilized as the basis of a sketching/modeling tool for children, allowing the computerized design and "virtual playing" based on branded toys, e.g., BARBIE™, LEGO™, or HOTWHEELS™, etc.
- In archeological research and forensic investigations the reconstruction of objects and environments from scattered and incomplete pieces is important. The present invention could be utilized to automatically determine what components are missing from a set of known components and provide models of the missing pieces.
- In chemistry, and specifically bio-chemistry and chemical engineering, the present invention could enable a practitioner to write an alpha numeric symbol on a screen and have returned a three-dimensional model of a molecule including relevant physical and electrochemical properties.

It should be expressly understood that these examples of implementations and the description in total is not intended to limit the scope of the present invention.

What is claimed is:

1. A system for modeling based upon a sketch, comprising:
   (a) a computer;
   (b) a database linked to the computer, said database being operable to store the following as one or more images: one or more stored images; at least one image of previously used geometry; and at least one previous drawing selected by a user and stored as an image of previously used geometry; and
   (c) a computer application linked to the computer, the computer application being operable to provide a sketching application, wherein:
      (i) the sketching application is operable to present to a user a suggestive modeling interface, the suggestive modeling interface being operable to:
         (A) infer characteristics of a drawing and characteristics of a currently drawn curve as inferred characteristics, said inferred characteristics including intersections and straightness of the drawing or currently drawn curve, and said suggestive modeling interface further being operable to provide suggestions of subsequent possible geometry that is similar geometry that can be used in the drawing without the need to draw the geometry, said suggestions being based upon the inferred characteristics; and
         (B) assist the user in producing a drawing based on: sketching input from the user; and one or more aspects of one or more images obtained from the database; and
      (ii) the suggestive modeling interface includes or is linked to a matching operator for:
         (A) accessing one or more images from the database dynamically based on one or more of the following: one or more inferred characteristics to determine subsequent possible geometry based on a current state of the drawing or a currently drawn curve; similar geometry based on the current state of the drawing or the currently drawn curve; and a curve signature based on the current state of the drawing or the currently drawn curve; and
         (B) accessing one or more images from the database iteratively in accordance with the current state of the drawing or the currently drawn curve, said accessed one or more images representing one or more of the following: exact matches, inferred subsequent possible geometry, or substantially similar matches to the current state of the drawing; and augmenting basic suggestions of similar geometry within more complex suggestions of similar geometry;
      (iii) the suggestive modeling interface is operable to permit a user to select one or more of the images accessed from the database as suggestions of images of similar geometry and thereby integrate the one or more suggestion images into the drawing; and
      (iv) the sketching application being operable to:
         (A) to continuously present to the user one or more images from the database based on similar geometry to a current state of the drawing including any currently drawn curve, in accordance with the suggestive modeling interface as the user continues drawing; and
         (B) to permit the user to select one or more drawings and to store said selected one or more drawings to the database to be used as images of previously used geometry by the suggestive modeling interface.

2. The system of claim 1, wherein the sketching application is operable to produce the drawing as a three-dimensional drawing.

3. The system of claim 1, wherein the sketching application is operable in accordance with a pen and a digitizing tablet.

4. The system of claim 1, wherein the sketching application is operable to utilize sketching input that is one or more of the following: an imported sketch; and a sketch produced by guided tools of the sketching application.

5. The system of claim 1, wherein the suggestive modeling interface is operable to display a predetermined number of suggestions of images identified by the matching operator on a screen linked to the computer.

6. The system of claim 1, wherein the sketching application is operable to utilize a gesture set to integrate one or more suggestions of images with a drawing.

7. The system of claim 1, wherein the suggestive modeling interface is operable filter a drawing to remove noise in sketch stroke and intensity, to iteratively move and resample points on sketched curves as required to minimize overall energy and bring said curves into conformity with selected image lines, and to allow a user to utilize a pen to generate a range of marks in the drawing as drawing marks, said pen being operable as any of the following:
  (a) a snapping interaction means, whereby the pen may be utilized to drag a curve away from a pin point location to adjust an area of influence of said curve;
  (b) a pinning interaction means, whereby the pen may be utilized to specify a point on the drawing where a drawn curve is to pass through, said curve being drawn to the specified point to adjust the area of influence; and
  (c) a gluing interaction means, whereby the pen is utilized to indicate a glued area and parts of the drawn curve lying within the glued area remain invariant and are not attracted to any underlying one or more images in the plane.

8. The system of claim 1, wherein the database is operable to store images that are one or more of the following: products, images, aspects of the drawing, and geometry.

9. The system of claim 1, wherein the sketching application is operable to store one or more of the following: one or more images identified in the drawing; and aspects of the drawing to the database to be utilized by the matching operator.

10. The system of claim 1, wherein the intersection inferred characteristic indicates that the currently drawn curve intersects with another curve on a different axial construction plane and the system suggests an extrusion as one of the suggestions of images of similar geometry.

11. The system of claim 1, wherein the straightness of the drawing or currently drawn curve is determined by iterating through the points of the currently drawn curve and summing the absolute angels between successive points, and the system suggests a closing curve as one of the suggestions of images of similar geometry.

12. A non-transitory computer program product for use on a computer, the non-transitory computer program product comprising:
  (a) a computer useable medium; and
  (b) computer readable program code recorded or storable in the computer useable medium, the computer readable program code defining a sketching application that is operable to:
    (i) present to a user a suggestive modeling interface, the suggestive modeling interface being operable to assist the user in producing a drawing based on: sketching input from the user; and one or more aspects of one or more images obtained from a database, said one or more images being stored in said database and including one or more stored images and one or more images of previously used geometry;
    (ii) utilize a matching operator linked to the suggestive modeling interface to:
      (A) infer characteristics of the drawing and characteristics of a currently drawn curve as inferred characteristics, said inferred characteristics including intersections and straightness of the drawing or currently drawn curve, and said suggestive modeling interface further being operable to dynamically and iteratively provide access to one or more images from the database based on the inferred characteristics as suggestions of subsequent possible geometry that is similar geometry to a current state of the drawing or a currently drawn curve that can be used in the drawing without the need to draw the geometry; and
      (B) access one or more images from the database dynamically and iteratively based on similar geometry to a current state of the drawing or a currently drawn curve, whereby the one or more images represent one or more of the following: exact matches or substantially similar matches to one or more of the following: the current state of the drawing, the currently drawn curve, and a curve signature of the currently drawn curve; or augmenting of basic suggestions of similar geometry within more complex suggestions of similar geometry;
    (iii) permit a user to select:
      (A) one or more of the images accessed from the database as suggestions of images of similar geometry and thereby integrate the one or more suggestion images into the drawing; and
      (B) one or more drawings and to store said selected one or more drawings to the database to be used as images of previously used geometry by the suggestive modeling interface; and
    (iv) continuously present to the user one or more images from the database based on similar geometry to a current state of the drawing in accordance with the suggestive modeling interface as the user continues drawing.

13. The computer program product of claim 12, further comprising a translator for translating input files for processing by the sketching application and output files created by the sketching application.

14. The computer product of claim 12, wherein the suggestive modeling interface is operable filter a drawing to remove noise in sketch stroke and intensity, to iteratively move and resample points on sketched curves as required to minimize overall energy and bring said curves into conformity with selected image lines, and to allow a user to utilize a pen to generate a range of marks in the drawing as drawing marks, said pen being operable as any of the following:
  (a) a snapping interaction means, whereby the pen may be utilized to drag a curve away from a pin point location to adjust an area of influence of said curve;
  (b) a pinning interaction means, whereby the pen may be utilized to specify a point on the drawing where a drawn curve is to pass through, said curve being drawn to the specified point to adjust the area of influence; and
  (c) a gluing interaction means, whereby the pen is utilized to indicate a glued area and parts of the drawn curve lying within the glued area remain invariant and are not attracted to any underlying one or more images in the plane.

15. The computer program of claim 12, wherein the suggestive modeling interface includes a camera tumbling feature and a zooming feature activated by an input device linked to the computer, and said tumbling and zooming feature being available in a cuboid working volume and an orthographic view of that plane.

16. The computer program of claim 12, wherein the computer readable program code is operable to store one or more of the following: one or more images identified in the drawing; and aspects of the drawing to the database to be utilized by the matching operator.

17. A method of sketch rendering, comprising the steps of:
(a) activating a sketching application linked to a computer and a database, the sketching application being operable to present a suggestive modeling interface;
(b) presenting to a user the suggestive modeling interface, the suggestive modeling interface being operable to:
(i) assist the user in producing a drawing based on: sketching input from the user; and one or more aspects of one or more images obtained from the database, said one or more images being stored in said database and including one or more stored images and one or more images of previously used geometry; and
(ii) applying a matching operator linked to the suggestive modeling interface to access one or more images from the database dynamically and iteratively based on similar geometry to a current state of the drawing or a currently drawn curve, said one or more images representing one or more of the following: exact matches or substantially similar matches to one or more of the following: the current state of the drawing, the currently drawn curve, and a curve signature of the currently drawn curve; and augmenting of basic suggestions of similar geometry within more complex suggestions of similar geometry;
(iv) the modelling interface inferring characteristics of the drawing and characteristics of the currently drawn curve as inferred characteristics, said inferred characteristics including intersections and straightness of the drawing or currently drawn curve, and dynamically and iteratively providing access to one or more images from the database based on the inferred characteristics as suggestions of subsequent possible geometry that is similar geometry to a current state of the drawing or a currently drawn curve that can be used in the drawing without the need to draw the geometry;
(c) permitting a user to select:
(i) one or more of the images accessed from the database as suggestions of images of similar geometry and to integrate the one or more suggestion images into the drawing; and
(ii) one or more drawings and storing said selected one or more drawings to the database to be used as images of previously used geometry by the suggestive modeling interface; and
(d) utilizing the sketching application to continuously present to the user one or more images from the database based on similar geometry to a current state of the drawing in accordance with the suggestive modeling interface as the user continues drawing.

18. The method of claim 17, comprising the further steps of:
(a) producing the drawing based on sketching input that may include one or more of the following: an imported sketch; and a sketch produced by guided tools of the sketching application; and
(b) producing the drawing in accordance with the sketching application as a three-dimensional drawing.

19. The method of claim 17, comprising the further steps of:
(a) performing a gesture set to integrate the one or more suggestions of images into the drawing; and
(b) utilizing a pen and a digitizing tablet to do one or more of the following:
(i) select the one or more suggestions of images;
(ii) produce the drawing; and
(iii) perform the gesture set.

20. The method of claim 17, comprising the further steps of:
(a) displaying the one or more suggestions of images on a screen; and
(b) choosing suggestions of images from images stored in the database that may include one or more of the following: products, images, aspects of the drawing, and geometry.

21. The method of claim 17, comprising the further step of: selecting one or more aspects of the drawing to be stored to the database.

22. The method of claim 17, comprising the further step of: providing access to the database as a billable service.

23. A method for suggesting design components utilizing a sketching application, comprising the steps of:
(a) importing a sketch to the sketching application to produce a drawing;
(b) applying a matching operator linked to a suggestive modeling interface in accordance with the sketching application, the matching operator being operable to access one or more images from a database dynamically based on similar geometry to a current state of the drawing, said one or more images being stored in said database and including one or more stored images and one or more images of previously used geometry;
(c) applying the matching operator dynamically to iteratively access suggestions of images of similar geometry based on the current state of the drawing, said one or more images being exact matches or substantially similar matches to the current state of the drawing and further applying the matching operator to access the modelling interface and to undertake the steps of:
(A) inferring characteristics of the drawing, said inferred characteristics including intersections and straightness of the drawing or currently drawn curve, and dynamically and iteratively providing access one or more images from the database based on the inferred characteristics as suggestions of subsequent possible geometry that is similar geometry to a current state of the drawing that can be used in the drawing without the need to draw the geometry; and
(B) augmenting basic suggestions of similar geometry within more complex suggestions of similar geometry of the accessed one or more images;
(d) permitting a user to select: one or more of the images accessed from the database as suggestions of images of similar geometry and to integrate the one or more suggestion images into the drawing; and one or more drawings and storing said selected one or more drawings to the database to be used as images of previously used geometry by the suggestive modeling interface; and
(e) applying the matching operator to continuously present to the user one or more images from the database based on similar geometry to a current state of the drawing as the user continues drawing.

* * * * *